(12) United States Patent
Nordstrom et al.

(10) Patent No.: US 9,914,505 B2
(45) Date of Patent: Mar. 13, 2018

(54) INSTALLATION METHOD FOR WATER-SUBMERSIBLE PLATFORMS AND INSTALLATION VESSEL

(75) Inventors: Charles J. Nordstrom, Detroit, MI (US); William L. Moon, III, Seattle, WA (US); Benjamin B. Ackers, Seattle, WA (US)

(73) Assignee: GLOSTEN, INC., Seattle, WA (US)

( * ) Notice: Subject to any disclaimer, the term of this patent is extended or adjusted under 35 U.S.C. 154(b) by 486 days.

(21) Appl. No.: 13/350,390

(22) Filed: Jan. 13, 2012

(65) Prior Publication Data

US 2012/0183359 A1 Jul. 19, 2012

Related U.S. Application Data

(60) Provisional application No. 61/432,825, filed on Jan. 14, 2011.

(51) Int. Cl.
| | | |
|---|---|---|
| E02B 17/02 | (2006.01) | |
| B63B 21/50 | (2006.01) | |
| B63B 35/00 | (2006.01) | |
| B63B 35/44 | (2006.01) | |
| E02B 17/00 | (2006.01) | |
| B63B 1/04 | (2006.01) | |

(52) U.S. Cl.
CPC ............ *B63B 21/50* (2013.01); *B63B 35/003* (2013.01); *B63B 35/44* (2013.01); *B63B 1/048* (2013.01); *B63B 21/502* (2013.01); *B63B 2001/044* (2013.01); *B63B 2021/505* (2013.01); *B63B 2035/446* (2013.01); *E02B 2017/0039* (2013.01); *E02B 2017/0047* (2013.01); *E02B 2017/0091* (2013.01); *Y02E 10/727* (2013.01)

(58) Field of Classification Search
CPC .................. E02B 17/02; E02B 17/021; E02B 2017/0047; E02B 2017/0039; E02B 2017/0043
USPC ......... 405/195.1, 203, 205, 206, 209, 223.1, 405/224
See application file for complete search history.

(56) References Cited

U.S. PATENT DOCUMENTS 2,837,897 A * 6/1958 Nedderman et al. ......... 405/196
2,909,901 A * 10/1959 Suderow ....................... 405/199
(Continued)

FOREIGN PATENT DOCUMENTS

| WO | 03/066427 A1 | 8/2003 |
| WO | 2009/024558 A1 | 2/2009 |
| WO | 2009/139616 A2 | 11/2009 |

OTHER PUBLICATIONS

International Search Report and Written Opinion dated Oct. 12, 2012, issued in corresponding International Application No. PCT/US2012/021293, filed Jan. 13, 2012, 9 pages.
(Continued)

*Primary Examiner* — Amber R Anderson
*Assistant Examiner* — Patrick F Lambe
(74) *Attorney, Agent, or Firm* — Christensen O'Connor Johnson Kindness PLLC

(57) ABSTRACT

A method for installing a water-submersible platform is disclosed. The method includes lowering the platform in water from a vessel positioned above the platform while spuds connecting the vessel to the platform stabilize the platform during lowering. An assembly of the vessel and platform, and a vessel that is used to connect to the platform is also disclosed.

14 Claims, 13 Drawing Sheets

(56) References Cited

U.S. PATENT DOCUMENTS

| | | | | |
|---|---|---|---|---|
| 3,540,396 | A * | 11/1970 | Horton | 114/265 |
| 3,593,529 | A * | 7/1971 | Smulders | 405/209 |
| 3,874,180 | A * | 4/1975 | Sumner | 405/198 |
| 4,161,376 | A * | 7/1979 | Armstong | 405/196 |
| 4,359,164 | A * | 11/1982 | Triplett | 212/294 |
| 4,762,442 | A * | 8/1988 | Thomas et al. | 405/196 |
| 5,163,783 | A * | 11/1992 | Fahrmeier et al. | 405/195.1 |
| 5,188,484 | A * | 2/1993 | White | 405/198 |
| 5,855,455 | A * | 1/1999 | Williford et al. | 405/196 |
| 6,196,767 | B1 * | 3/2001 | Thomas | 405/203 |
| 6,293,734 | B1 * | 9/2001 | Thomas et al. | 405/209 |
| 6,481,932 | B1 * | 11/2002 | Riemers | 405/224.1 |
| 6,612,781 | B1 * | 9/2003 | Jackson | 405/209 |
| 6,652,192 | B1 * | 11/2003 | Xu et al. | 405/195.1 |
| 7,234,409 | B2 * | 6/2007 | Hansen | 114/258 |
| 7,513,713 | B2 * | 4/2009 | Thomas et al. | 405/203 |
| 7,594,781 | B1 * | 9/2009 | Sanders | 405/198 |
| 7,850,398 | B2 * | 12/2010 | Foo et al. | 405/212 |
| 7,877,933 | B2 | 2/2011 | Watchorn | |
| 7,963,241 | B2 * | 6/2011 | Srinivasan | 114/267 |
| 8,070,388 | B2 * | 12/2011 | Thomas | 405/203 |
| 8,230,802 | B2 * | 7/2012 | Siegfriedsen | 114/268 |
| 2004/0262926 | A1 | 12/2004 | Hansen | |
| 2006/0051164 | A1 * | 3/2006 | Foo et al. | 405/228 |
| 2008/0101872 | A1 * | 5/2008 | Munk et al. | 405/223.1 |
| 2008/0131209 | A1 * | 6/2008 | Thomas | 405/198 |
| 2009/0092448 | A1 * | 4/2009 | Pallini et al. | 405/224 |
| 2009/0217852 | A1 | 9/2009 | Zaman | |
| 2011/0305521 | A1 * | 12/2011 | Henstra et al. | 405/198 |

OTHER PUBLICATIONS

Examination Report under Section 18(3) dated Jul. 1, 2015, in corresponding Application No. GB1313063.8, filed Jan. 13, 2012, 5 pages.

* cited by examiner

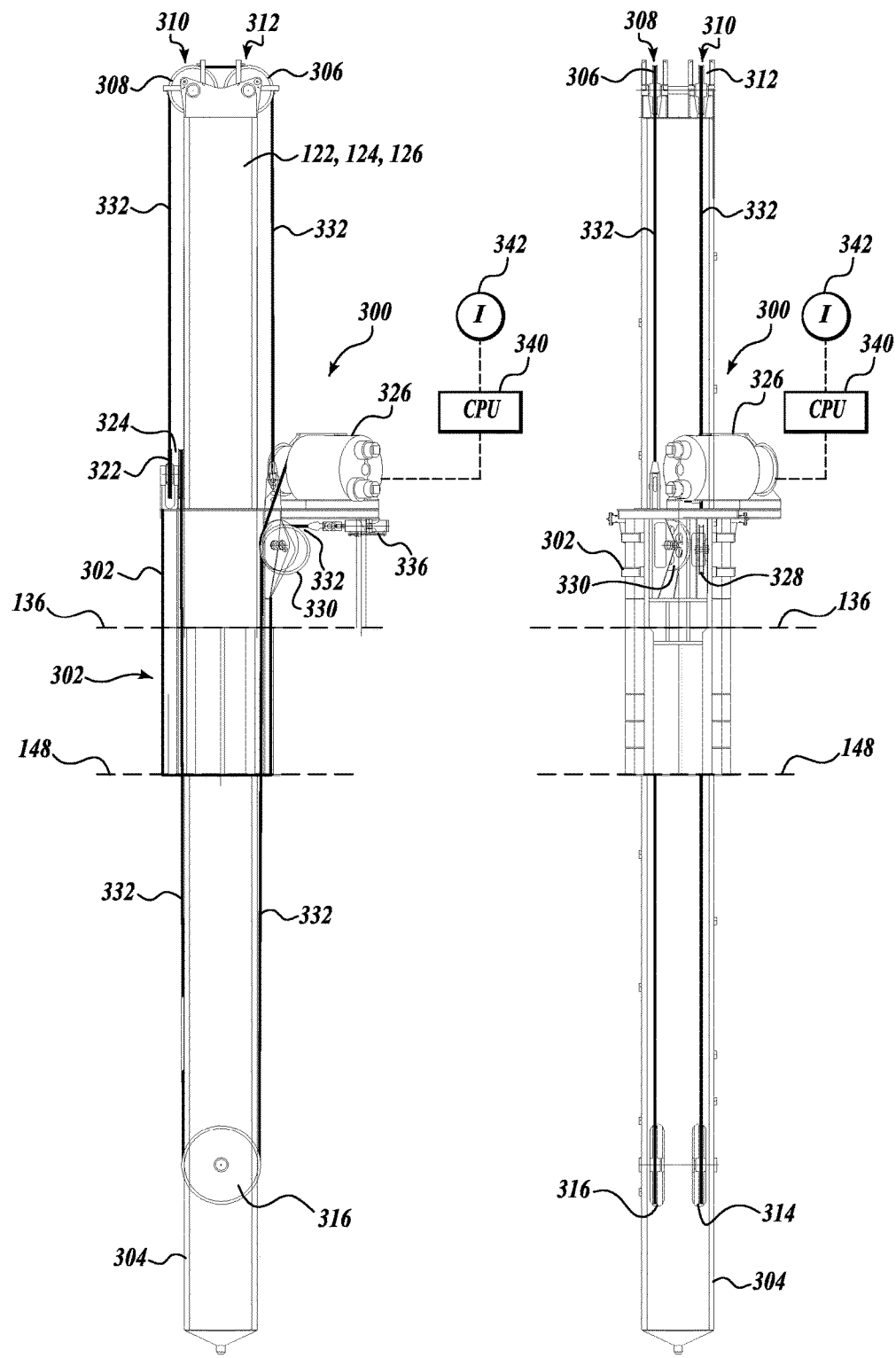

INSTALLATION METHOD FOR WATER-SUBMERSIBLE PLATFORMS AND INSTALLATION VESSEL

CROSS-REFERENCE TO RELATED APPLICATION

This application claims the benefit of U.S. Provisional Application No. 61/432,825, filed Jan. 14, 2011, which is fully incorporated herein expressly by reference.

BACKGROUND

A jack-up rig is a type of offshore platform consisting of legs ("spuds") that can be lowered or raised vertically. A jack-up platform can be towed or is self propelled. Once at a chosen location, the legs are lowered vertically to rest on the sea floor. The bottom ends of the legs may be configured to penetrate the sea floor, or may be provided with pads to support themselves on the sea floor. Once the legs reach the sea floor and can no longer be lowered, the platform is lifted above the surface of the water such that the platform is no longer floating on the surface of the water, but is supported above the surface of the water by the legs.

A somewhat similar technology is used by barges that wish to remain stationary on the surface of the water while performing some type of work. In this type of vessel, a barge may consist of a plurality of spuds that are similarly driven vertically downward to support themselves from the sea floor. In this case, however, the vessel remains floating on the surface of the water while the spuds hold the vessel at a stationary location. While stationary, the vessel may perform various types of work. In some cases the barge is partially lifted by the spuds to further stabilize the barge, for example, excavator barges may be used to dredge a channel.

SUMMARY

A method for installing a water-submersible platform may include lowering the platform in water from a vessel positioned above the platform while spuds connecting the vessel to the platform stabilize the platform during lowering.

In another embodiment, together with any combination of one or more steps and/or features recited above and/or below pertaining to the method for installing a water-submersible platform, the method may further include, before lowering the platform in the water, placing the vessel over the platform, and connecting a lower end of the spuds to the platform.

In another embodiment, together with any combination of one or more steps and/or features recited above and/or below pertaining to the method for installing a water-submersible platform, the method may further include, to place the vessel over the platform, lowering the platform below a water surface to a depth that allows placing the vessel over the platform.

In another embodiment, together with any combination of one or more steps and/or features recited above and/or below pertaining to the method for installing a water-submersible platform, the method may further include, ballasting the platform with water to assist in lowering the platform before placing the vessel over the platform.

In another embodiment, together with any combination of one or more steps and/or features recited above and/or below pertaining to the method for installing a water-submersible platform, the method may further include, after connecting the spuds to the platform, raising the spuds and raising the platform to a position underneath the vessel.

In another embodiment, together with any combination of one or more steps and/or features recited above and/or below pertaining to the method for installing a water-submersible platform, the method may further include, de-ballasting the platform of water to assist in raising the platform to the vessel.

In another embodiment, together with any combination of one or more steps and/or features recited above and/or below pertaining to the method for installing a water-submersible platform, the method may further include, after the platform is lowered to a predetermined depth in the water, attaching mooring elements from a seafloor to the platform.

In another embodiment, together with any combination of one or more steps and/or features recited above and/or below pertaining to the method for installing a water-submersible platform, the method may further include, after the platform is attached to the seafloor via tendons, disconnecting the spuds from the platform, and then raising the spuds.

In another embodiment, together with any combination of one or more steps and/or features recited above and/or below pertaining to the method for installing a water-submersible platform, the method may further include wherein the vessel floats on the surface of the water while lowering the platform.

In another embodiment, together with any combination of one or more steps and/or features recited above and/or below pertaining to the method for installing a water-submersible platform, the method may further include wherein the vessel is directly above the platform while lowering the platform.

In another embodiment, together with any combination of one or more steps and/or features recited above and/or below pertaining to the method for installing a water-submersible platform, the method may further include, wherein the spuds apply a downward force on the platform to lower the platform in the water.

In another embodiment, together with any combination of one or more steps and/or features recited above and/or below pertaining to the method for installing a water-submersible platform, the method may further include, wherein the spuds apply an upward force on the platform while lowering the platform in the water.

In another embodiment, together with any combination of one or more steps and/or features recited above and/or below pertaining to the method for installing a water-submersible platform, the method may further include, wherein the platform has neutral buoyancy during lowering.

In another embodiment, together with any combination of one or more steps and/or features recited above and/or below pertaining to the method for installing a water-submersible platform, the method may further include, wherein the platform has negative buoyancy during lowering.

In another embodiment, together with any combination of one or more steps and/or features recited above and/or below pertaining to the method for installing a water-submersible platform, the method may further include, wherein the platform has positive buoyancy during lowering.

In another embodiment, together with any combination of one or more steps and/or features recited above and/or below pertaining to the method for installing a water-submersible platform, the method may further include, ballasting the platform with water before or during lowering.

In another embodiment, together with any combination of one or more steps and/or features recited above and/or below pertaining to the method for installing a water-submersible platform, the method may further include, before lowering the platform in the water, moving the vessel with the platform juxtaposed underneath the vessel to an installation site.

In another embodiment, together with any combination of one or more steps and/or features recited above and/or below pertaining to the method for installing a water-submersible platform, the method may further include, wherein the platform comprises superstructure supported on a central hull, wherein the superstructure extends above the water surface.

In another embodiment, together with any combination of one or more steps and/or features recited above and/or below pertaining to the method for installing a water-submersible platform, the method may further include, wherein the spuds connected to the platform are held in a fixed lateral position on the vessel, and the spuds connected to the platform are configured to lower and raise while in the fixed lateral position.

In another embodiment, together with any combination of one or more steps and/or features recited above and/or below pertaining to the method for installing a water-submersible platform, the method may further include, wherein the spuds connected to the platform are elongated rigid members positioned vertically on the vessel.

In another embodiment, together with any combination of one or more steps and/or features recited above and/or below pertaining to the method for installing a water-submersible platform, the method may further include, wherein the platform would capsize in water when unattached to the vessel.

In another embodiment, together with any combination of one or more steps and/or features recited above and/or below pertaining to the method for installing a water-submersible platform, the method may further include, wherein when the spuds reach a limit of downward extension, the spuds do not reach a seafloor.

In another embodiment, together with any combination of one or more steps and/or features recited above and/or below pertaining to the method for installing a water-submersible platform, the method may further include, wherein the platform is a tension leg platform comprising a central hull and tendon arms extending radially from the central hull.

In another embodiment, together with any combination of one or more steps and/or features recited above and/or below pertaining to the method for installing a water-submersible platform, the method may further include, wherein the spuds connected to the platform are laterally spaced from one another on the vessel.

An embodiment of an assembly of a water-submersible platform and water-buoyant vessel may include a water-buoyant vessel on a surface of water; and a water-submersible platform having substantial superstructure extending above the water surface, wherein the platform is juxtaposed below the vessel and connected to the vessel to receive a stabilizing force from the vessel.

In another embodiment, together with any combination of one or more features recited above and/or below pertaining to the assembly of the water-submersible platform and the water-buoyant vessel, the assembly may further include, wherein the platform has positive, neutral or negative buoyancy when unattached to the vessel.

In another embodiment, together with any combination of one or more features recited above and/or below pertaining to the assembly of the water-submersible platform and the water-buoyant vessel, the assembly may further include, wherein the platform is configured to be anchored to a sea floor.

In another embodiment, together with any combination of one or more features recited above and/or below pertaining to the assembly of the water-submersible platform and the water-buoyant vessel, the assembly may further include, wherein the vessel comprises spuds, the spuds connect the vessel to the platform, the spuds are held in a fixed lateral position on the vessel, and the spuds connected to the platform are configured to lower and raise while in the fixed lateral position.

In another embodiment, together with any combination of one or more features recited above and/or below pertaining to the assembly of the water-submersible platform and the water-buoyant vessel, the assembly may further include, wherein the vessel comprises spuds, the platform comprises a central hull and tendon arms extending radially from the central hull, the spuds are connected to the tendon arms, the spuds are held in a fixed lateral position on the vessel, and the spuds connected to the tendon arms are configured to lower and raise while in the fixed lateral position.

In another embodiment, together with any combination of one or more features recited above and/or below pertaining to the assembly of the water-submersible platform and the water-buoyant vessel, the assembly may further include, wherein the vessel comprises spuds, the spuds connect the vessel to the platform, the spuds are held in a fixed lateral position on the vessel, and the spuds connected to the platform are configured to restrain the platform when transiting at sea.

In another embodiment, together with any combination of one or more features recited above and/or below pertaining to the assembly of the water-submersible platform and the water-buoyant vessel, the assembly may further include, wherein the vessel comprises spuds, the spuds connect the vessel to the platform, and the spuds are elongated rigid members positioned substantially vertically on the vessel.

In another embodiment, together with any combination of one or more features recited above and/or below pertaining to the assembly of the water-submersible platform and the water-buoyant vessel, the assembly may further include, wherein the vessel comprises spuds, the spuds connect the vessel to the platform, and the spuds are laterally spaced from one another on the vessel.

In another embodiment, together with any combination of one or more features recited above and/or below pertaining to the assembly of the water-submersible platform and the water-buoyant vessel, the assembly may further include, wherein the platform comprises a central hull and tendon arms extending radially from the central hull, and the tendon arms are tapered to reduce the thickness of the tendon arms from the central hull toward the end of the tendon arms.

In another embodiment, together with any combination of one or more features recited above and/or below pertaining to the assembly of the water-submersible platform and the water-buoyant vessel, the assembly may further include, wherein the platform comprises a raised structure on the platform, the raised structure extends above the vessel, and the vessel comprises a notch to allow space for the raised structure.

In another embodiment, together with any combination of one or more features recited above and/or below pertaining to the assembly of the water-submersible platform and the water-buoyant vessel, the assembly may further include, wherein the vessel comprises spuds, the spuds comprise a bottom end connected to the upper side the platform to hold the platform stable.

In another embodiment, together with any combination of one or more features recited above and/or below pertaining to the assembly of the water-submersible platform and the water-buoyant vessel, the assembly may further include, wherein the vessel comprises spuds, the spuds traverse the structural depth of the vessel to connect to the platform, and the spuds extend above the vessel.

In another embodiment, together with any combination of one or more features recited above and/or below pertaining to the assembly of the water-submersible platform and the water-buoyant vessel, the assembly may further include, wherein the platform comprises water ballast chambers.

In another embodiment, together with any combination of one or more features recited above and/or below pertaining to the assembly of the water-submersible platform and the water-buoyant vessel, the assembly may further include, wherein the vessel comprises spuds, the bottom end of the spuds have a locking assembly comprising a tip extending downwardly, wherein the tip is configured to rotate in a horizontal plane.

In another embodiment, together with any combination of one or more features recited above and/or below pertaining to the assembly of the water-submersible platform and the water-buoyant vessel, the assembly may further include, wherein the locking assembly comprises a tension support ring and a compression support ring concentric to the tip.

In another embodiment, together with any combination of one or more features recited above and/or below pertaining to the assembly of the water-submersible platform and the water-buoyant vessel, the assembly may further include wherein the locking assembly comprises a tip having a cylindrical body and one or more tabs on a circumference of the tip body.

In another embodiment, together with any combination of one or more features recited above and/or below pertaining to the assembly of the water-submersible platform and the water-buoyant vessel, the assembly may further include, wherein the tip is configured to lock into an alignment cone located on a top surface of a platform, the tip includes one or more locking tabs that are locked with keys surrounding an inner circumference of the cone.

An embodiment of a buoyant vessel may include a deck; a hull supporting the deck; and rigid elongated spuds positioned vertically on the vessel, wherein the spuds are fixed in a lateral position and configured to descend below the hull, and wherein a lower end of the spuds is configured to lock onto a platform.

In another embodiment, together with any combination of one or more features recited above and/or below pertaining to the buoyant vessel, the buoyant vessel may further include, a notch in the deck and hull extending inward from a side of the vessel that forms a first and second deck section on a first and second side of the notch, and at least one spud is located in the first deck section, in the second deck section, and in a deck section connecting the first deck section to the second deck section.

In another embodiment, together with any combination of one or more features recited above and/or below pertaining to the buoyant vessel, the buoyant vessel may further include, wherein the spuds comprise a locking assembly comprising a tip extending downwardly from a bottom end of the spuds, wherein the tip is configured to rotate in a horizontal plane to lock the spuds to a platform.

In another embodiment, together with any combination of one or more features recited above and/or below pertaining to the buoyant vessel, the buoyant vessel may further include, wherein the tip has a cylindrical body with one or more tabs on a circumference of the tip body.

In another embodiment, together with any combination of one or more features recited above and/or below pertaining to the buoyant vessel, the buoyant vessel may further include, wherein the spuds comprise a locking assembly comprising a tip extending downwardly from a bottom end of the spuds, and the locking assembly includes a tension support ring and a compression support ring, both placed concentric to the tip.

In another embodiment, together with any combination of one or more features recited above and/or below pertaining to the buoyant vessel, the buoyant vessel may further include, wherein the compression ring comprises an elastomer laminated between an outer and inner ring.

In another embodiment, together with any combination of one or more features recited above and/or below pertaining to the buoyant vessel, the buoyant vessel may further include, wherein the tension support ring comprises an elastomer laminated between an outer and inner ring.

In another embodiment, together with any combination of one or more features recited above and/or below pertaining to the buoyant vessel, the buoyant vessel may further include, wherein the compression support ring and the tension support ring are spaced apart from each other along the vertical direction of the tip, and are flexible to allow for the tip to rotate about a horizontal axis.

In another embodiment, together with any combination of one or more features recited above and/or below pertaining to the buoyant vessel, the buoyant vessel may further include means for propulsion on a surface of the water.

In another embodiment, together with any combination of one or more features recited above and/or below pertaining to the buoyant vessel, the buoyant vessel may further include a winch system for raising and lowering spuds that can be controlled to provide constant force on spuds.

In another embodiment, together with any combination of one or more features recited above and/or below pertaining to the buoyant vessel, the buoyant vessel may further include means for mooring to the sea floor.

In another embodiment, together with any combination of one or more features recited above and/or below pertaining to the buoyant vessel, the buoyant vessel may further include means for dynamically positioning the vessel.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 13 is a diagrammatical illustration showing one embodiment of a winch system; and FIG. 14 is a diagrammatical illustration showing one embodiment of a winch system.

DETAILED DESCRIPTION

Disclosed herein is a method for installing a water-submersible platform. One embodiment of the method is illustrated in FIGS. 1-8. In one embodiment, the method may be used to install substantially assembled offshore wind turbines, such as wind turbine 106. While a description of the method will proceed using a tension leg platform and wind turbine as an illustrative embodiment of a water-submersible platform, it is to be appreciated that the invention is not thereby limited. The disclosed method may be used for installing any type of water-submersible platform. In particular, the method may be used for installing water-submersible platforms that have substantial superstructure rising above the water surface, such that the platforms may need to be stabilized during transport and installation. As used herein "stabilize" or the act of stabilizing refers to the application of forces to a platform to prevent the platform from capsizing. Capsize means to incline beyond the maximum stability angle. The maximum stability angle is the inclination angle past which a vessel or platform is unable to return itself to its upright position. The maximum stability angle is also referred to as the angle of vanishing stability. Also disclosed is an installation vessel that stabilizes water-submersible platform, and unstable platforms having substantial superstructure above the water surface. The installation vessel may be used for transporting and installing such platforms, as well as retrieving them.

Figure 1:
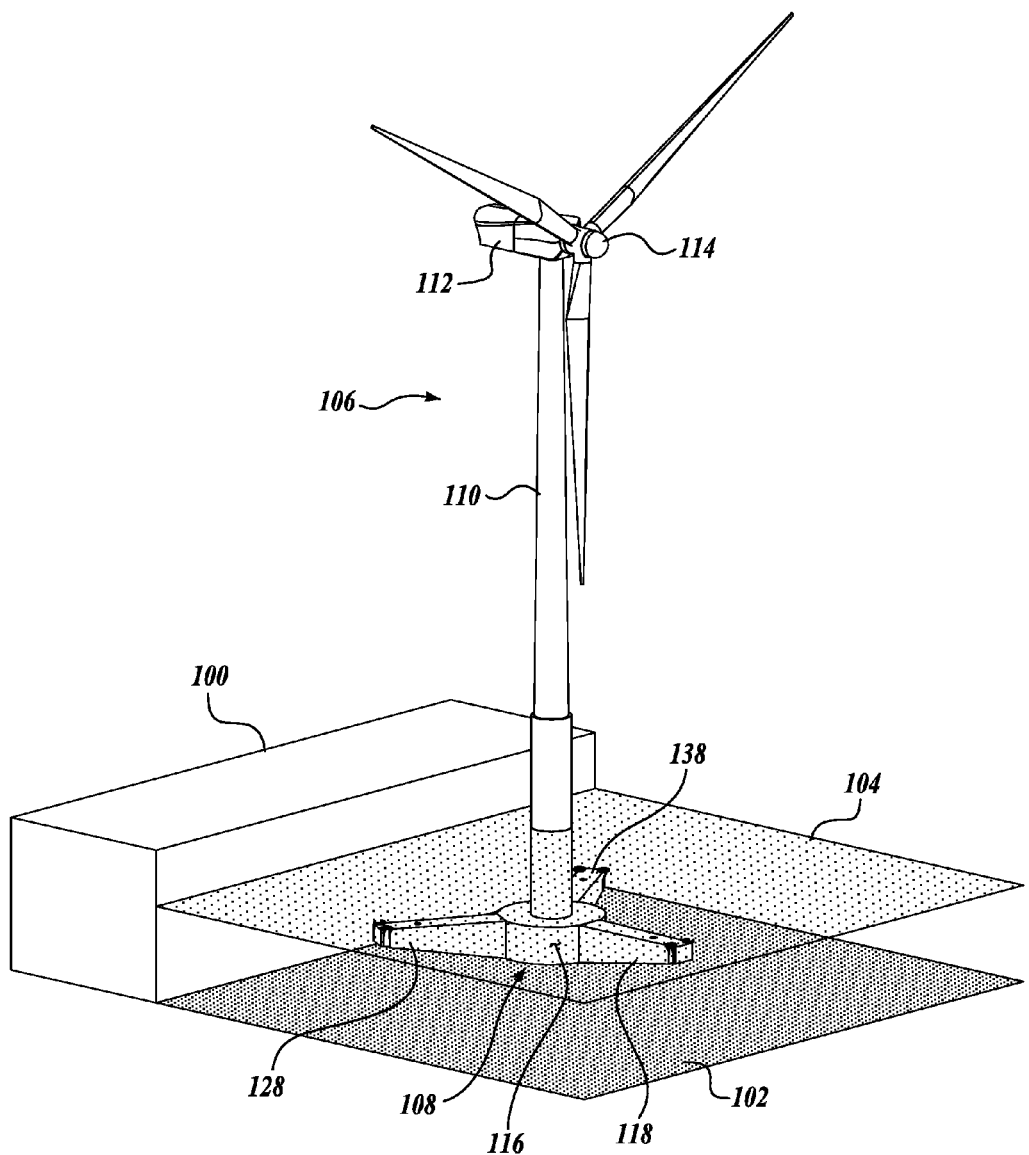
FIG. 1 is a diagrammatical illustration showing one embodiment of a step for a method of installing a water-submersible platform.

As seen in FIG. 1, a tension leg platform 108 comprises a central tendon hull 116, and a plurality of tendon arms 118, 128 spaced equally around the tendon hull 116, wherein the tendon arms 118 and 128 extend radially outward from the central hull 116. In one embodiment of a substantially assembled offshore wind turbine, the offshore wind turbine includes a tension leg platform 108 provided with a tower 110, a turbine 112 supported at the top end of the tower 110, and a rotating blade assembly 114 connected to the turbine 112. The combination of the tower 110, the turbine 112 and the blade assembly 114 is an example of superstructure above the water surface. It is to be appreciated that water-submersible platforms may be installed using the disclosed method in any ocean, lake, or other body of water, regardless, whether it is a salt or fresh water body.

Figure 2:
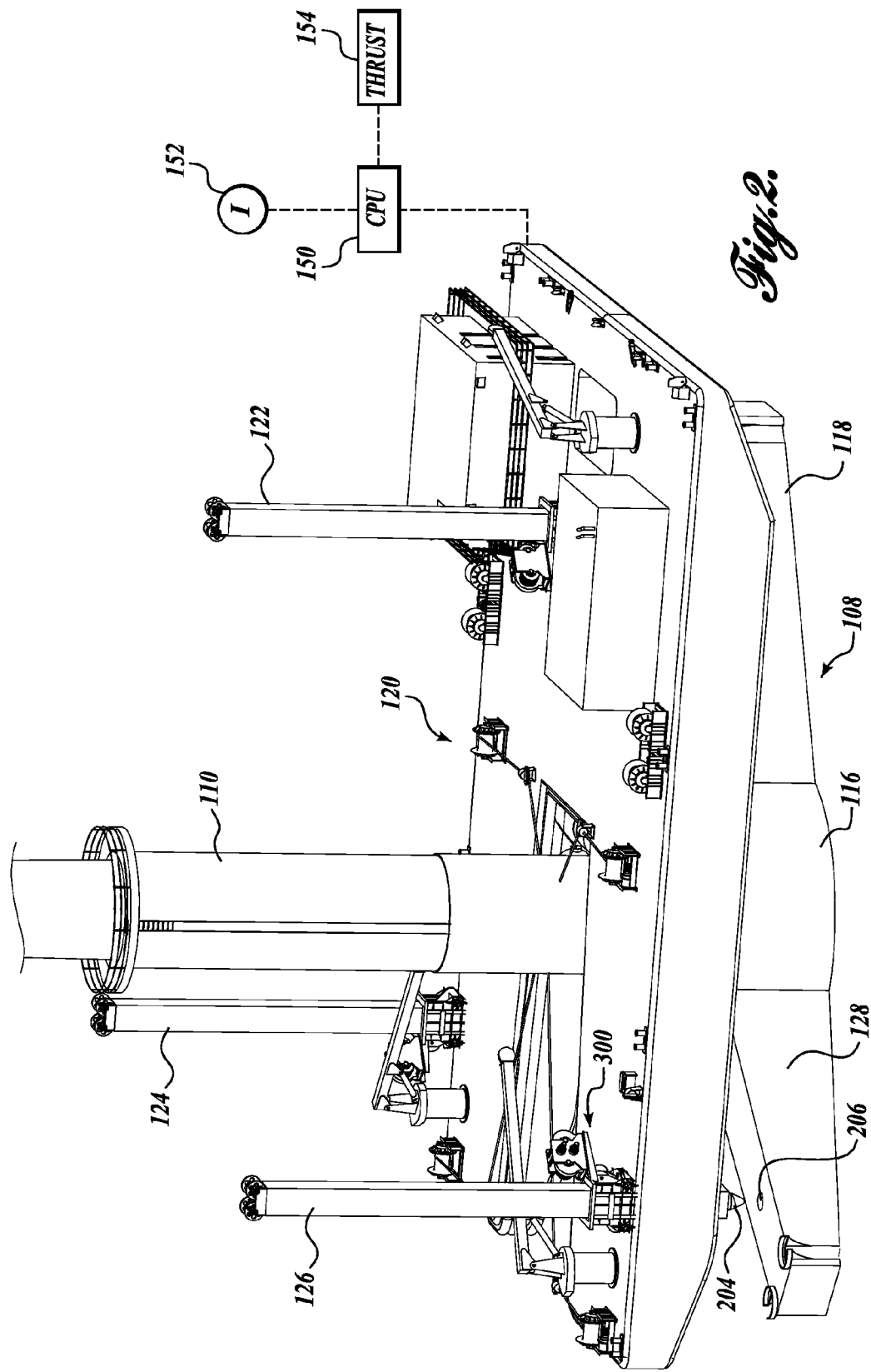
FIG. 2 is a diagrammatical illustration showing one embodiment of a step for a method of installing a water-submersible platform.

Referring to FIG. 1, in one illustrative example of the disclosed method, a substantially assembled tension leg platform 108 and wind turbine 106 is placed alongside a quay 100. In the installation method, the method includes ballasting the tension leg platform 108 by introducing water to any water ballast chamber to assist in lowering the platform 108 below the surface 104 of the water before a vessel is placed over the platform 108. The submerged platform 108 may come to rest on the sea floor 102 alongside the quay 100, or alternatively, any man-made structure. A purpose for submerging the platform 108 below the surface of the water 104 is to allow an installation vessel 120 to be placed above the platform 108, as seen in FIG. 2. In the installation method, the installation vessel 120 may be placed over the platform 108 by floating the vessel 120 directly over the platform 108 to connect the vessel 120 to the platform 108. The vessel 120 needs to be placed over the platform 108 to allow installing the platform 108. One embodiment requires submerging or lowering the platform 108 below the surface of the water to a depth that allows placing the vessel 120 over the platform 108. In other embodiments, the installation vessel 120 may be hoisted on a crane, or otherwise, and positioned above the platform 108 in a dry dock, or alternatively, while the platform 108 is floating on the surface of the water. The purpose of placing the vessel 120 over the platform 108 is to secure the platform 108 to the vessel 120 via the use of spuds 122, 124, and 126. The vessel 120 and platform 108 are aligned such that the spuds 122, 124, and 126, are aligned directly over the tendon arms 118, 128, and a third tendon arm that is not visible.

The vessel 120 is water-buoyant, and is constructed having at least a deck and hull below the deck. A specially built installation vessel 120 for transporting a wind turbine 106, or any other structure that rises above the level of the deck of the vessel 120 may be constructed with a notch formed on one side thereof. This allows the placement of the vessel 120 directly above the platform, such that the vessel 120 and the platform 108 overlap with each other. The notch divides part of the vessel 120 into a first and second deck section with a section connecting the first section to the second section. The vessel 120 can include more than one spud, such as spuds 122, 124, and 126. Each spud can be an elongated rigid member positioned substantially vertically on the vessel 120. Each spud 122, 124, and 126 is held in a fixed position with respect to lateral motion, while allowing each spud to be raised or lowered below the surface of the water. In one embodiment, each spud 122, 124, and 126 traverses the deck and hull of the vessel 120. However, in other embodiments, the spuds can be located at the outer sides of the vessel. Each spud may include a drive mechanism to raise and lower the spud independent of all other spuds on the vessel 120. Alternatively, a single drive mechanism can be used to simultaneously drive all spuds. Alternatively, any two or more spuds can be driven by one drive mechanism. Various configurations are possible for the drive mechanisms that raise and lower the spuds. In one embodiment, for example, the drive mechanism that raises and lowers the spuds may include the use of a rack and pinion system. In another embodiment, the drive mechanism includes a winch system, described below in association with FIG. 13.

Figure 3:
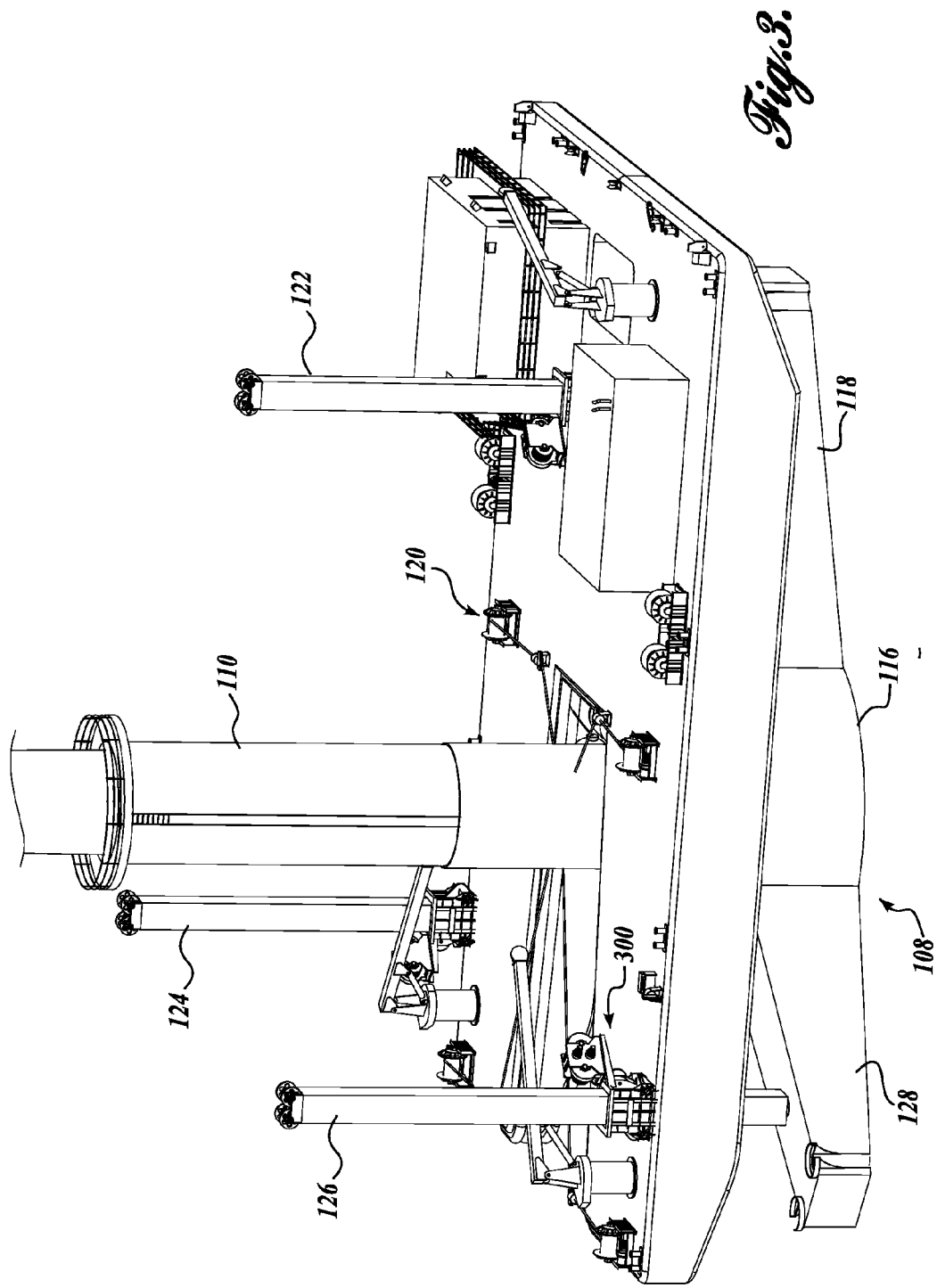
FIG. 3 is a diagrammatical illustration showing one embodiment of a step for a method of installing a water-submersible platform.

In FIGS. 2 and 3, which show connecting the vessel 120 to the platform 108, each spud 122, 124, and 126 is driven downwardly to connect a bottom end of a spud to a top side of the platform 108. In one embodiment, the platform 108 includes tendon arms 118, 128, and a tendon arm that is not visible. In this case, the spuds of the vessel 120 can connect to the tendon arms, such as tendon arm 130 being connected to the bottom end of spud 126, as shown in FIG. 3. After each spud is connected to a tendon arm, the drive mechanism or mechanisms may be engaged to raise the platform 108 from the sea floor via the raising of the spuds. Before or during the step of raising the platform 108 to the bottom side, or underneath, of the vessel 120, and after connecting the spuds to the platform 108, the platform 108 may be de-ballasted of water to reduce the loads on the spuds or to create positive buoyancy to increase the bottom contact pressure between the top surface of the platform, such as the top surface of the central hull 116 and the top surface of each tendon arm, such as tendon arms 118 and 130, to the bottom side of the vessel 120 hull. During the step of raising the platform 108 to the underside of the vessel 108, the platform 108 can begin as negatively buoyant, then be neutrally buoyant, and finally, positively buoyant. "Buoyancy" refers to the sum of buoyant forces and the weight of the object. In addition, the vessel 120 can also be ballasted. The vessel 120 can be ballasted in order to adjust for trim, heel, draft, or to change the vertical center of gravity of the vessel or assembly, such assembly comprising the vessel 120 and the platform 108. In order to juxtapose the top surface of the platform 108 next to the bottom side of the vessel 120, the bottom side of the hull of the vessel 120 is provided with a planar surface. Similarly, the top surface of the platform 108 including top surfaces of the central hull 116, except for the tower, and the top surfaces of each tendon arm 118, 128, and 138 are formed to lie in a plane that spans, at least, across two or more opposing tendon arms, making the majority of the upper surface a planar surface as well. The connections between the bottom end of the spuds and the top surface of the tendon arms are substantially rigid, such that the spuds will stabilize the platform 108. An advantage of the disclosed method is that while the water-submersible platform 108 can be unstable in water, the vessel 108 is stable in water and imparts stability to the platform 108 during transporting and lowering during installation. One measure of stability is the ability of the vessel 120 with spuds to keep the platform 108 from capsizing during lowering of the platform in water. Some flexing of the connections between the spuds and the platform is possible, as explained further below. For example, some relative motion in pitch and roll may be allowed should it be necessary to relieve loads in the spuds and connections. Additionally, lines may be used to further attach the platform 108 or the tower 110 to secure the platform to the vessel 120.

Figure 4:
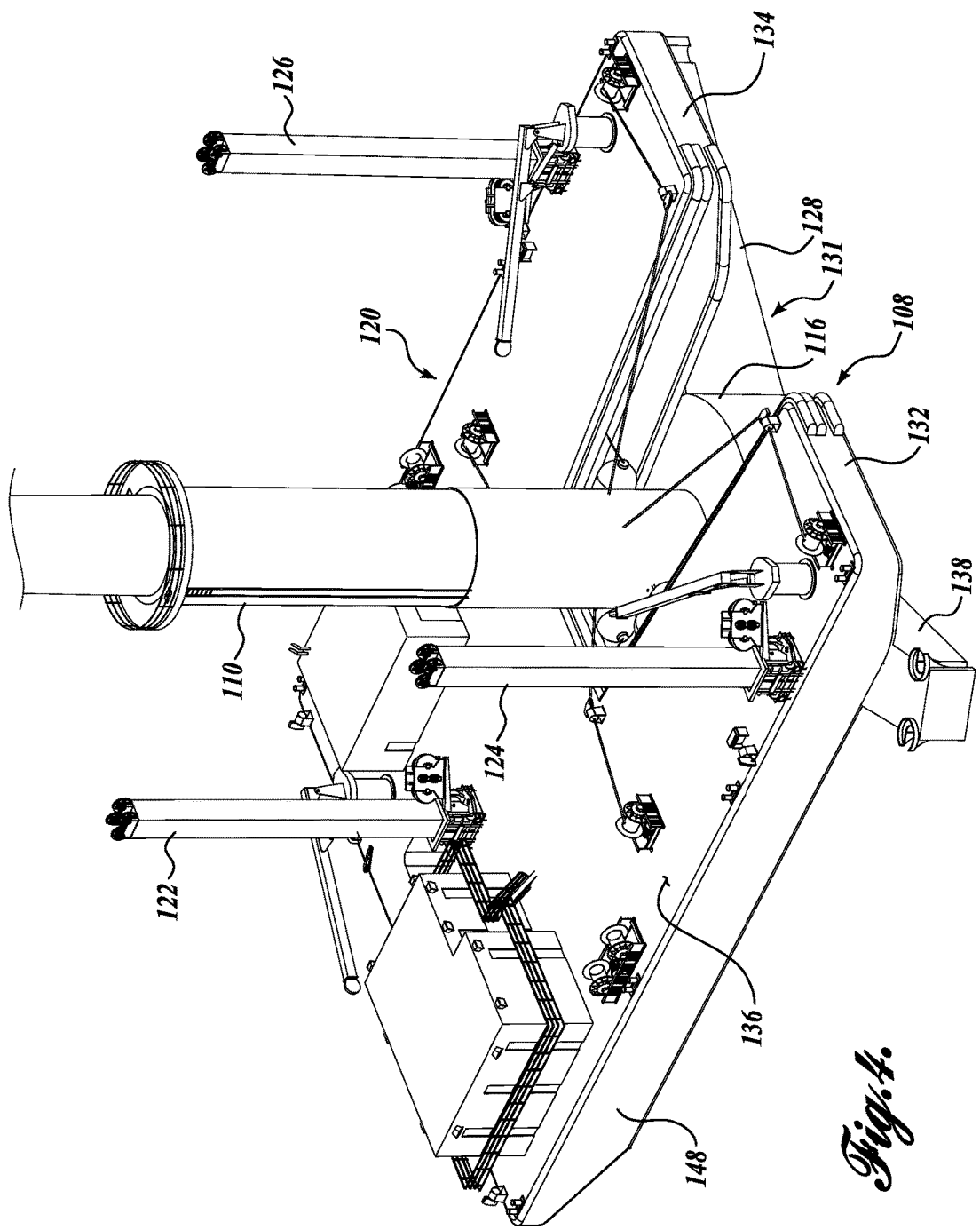
FIG. 4 is a diagrammatical illustration showing one embodiment of a step for a method of installing a water-submersible platform.

Referring to FIG. 4, the vessel 120 is seen in more detail. The vessel 120 includes at least a top deck 136 and a hull 148 connected to the deck 136. The vessel 120 is water-buoyant, stable in the water, and designed to float on water. In one embodiment, both the deck 136 and the hull 148 are modified at one side thereof to provide a notch 131, which allows the tower 110 to be cradled within the notch 131. Shock-absorbing materials may be placed in and around the notch 131 to prevent damage to the tower. The notch 131 in the vessel 120 creates a first deck section 132 and a second deck section 134. The deck sections 132 and 134 are connected by a third deck section that spans to connect to the first and second deck sections and the notch 131. The deck section 132 includes a vertically positioned rigid spud 124, and the deck section 134 includes a vertically positioned rigid spud 126. The deck section spanning across the first and second deck sections 132 and 134 along with the notch 131 includes a third vertically positioned rigid spud 122. However, the placement of the spuds on the vessel can depend on the shape of the platform. For example, for square-shaped platforms that have hulls on each of four corners, the vessel 108 can be constructed to have four or more spuds corresponding to the four corners of the square-shaped platform. Furthermore, the spuds can be placed on the outer sides of the deck and hull of a vessel.

The deck 136 of the vessel 120 may include other machinery to provide support for installing the platform 108. For example, the deck 136 may be provided with one or more cranes, a control station, and living quarters for personnel. Additionally, the vessel 120 may be self-propelled, or, alternatively, the vessel 120 can be towed to the installation site where the platform is to be anchored to a sea floor, or other bottom surface in a body of water. A suitable means for dynamically positioning a vessel may include a manually controlled or computer-controlled propulsion system that maintains the vessel's position and heading within a specified tolerance. A suitable dynamically positioning means may include a global positioning system (GPS). Typical propulsion or positioning systems using propellers may be used.

The vessel 120 disclosed herein coupled to a water-submersible platform forms a stable assembly comprising the water-buoyant vessel 120 and a platform, which may or may not be stable, such as a substantially completed tension leg platform 108 with wind turbine 106, or other superstructure that rises above the water surface. An advantage of the assembly is to provide stability to an otherwise unstable platform, such as the platform 108 with the wind turbine 106 that would be unstable when unsupported by an external (to the platform) structure or vessel, and not connected to any mooring elements. In one embodiment of an assembly, the tension leg platform 108 comprises tendon arms 118, 128, and 138, extending radially from a central hull 116, and the vessel 120 is placed over the platform 108 and connected to the platform 108 with rigid vertically positioned spuds 122, 124, and 126, extending below the platform 108 such that the spuds connect to the tendon arms of the platform. With this assembly, the platform 108 can be submerged underneath the surface of the water, while the vessel floats on the surface of the water and imparts stability to the platform 108. The vessel 120 may have a substantially planar bottom to allow the platform 108 to be juxtaposed or placed against and directly beneath the bottom side of the vessel 120. The platform 108 for this assembly may also be constructed to include a top side that lies on a plane spanning across the top of the platform including any two or more opposing tendon arms, such as tendon arms 128 and 138. With the disclosed assembly of a vessel and platform, numerous advantages may be gained, such as allowing the transport of a platform having a substantially assembled wind turbine or other superstructure, which would render the platform unstable and be prone to capsize if unattached to the vessel. The stabilized fully-assembled platform can be transported to an installation site, avoiding the need to assemble the platform offshore.

Figure 5:
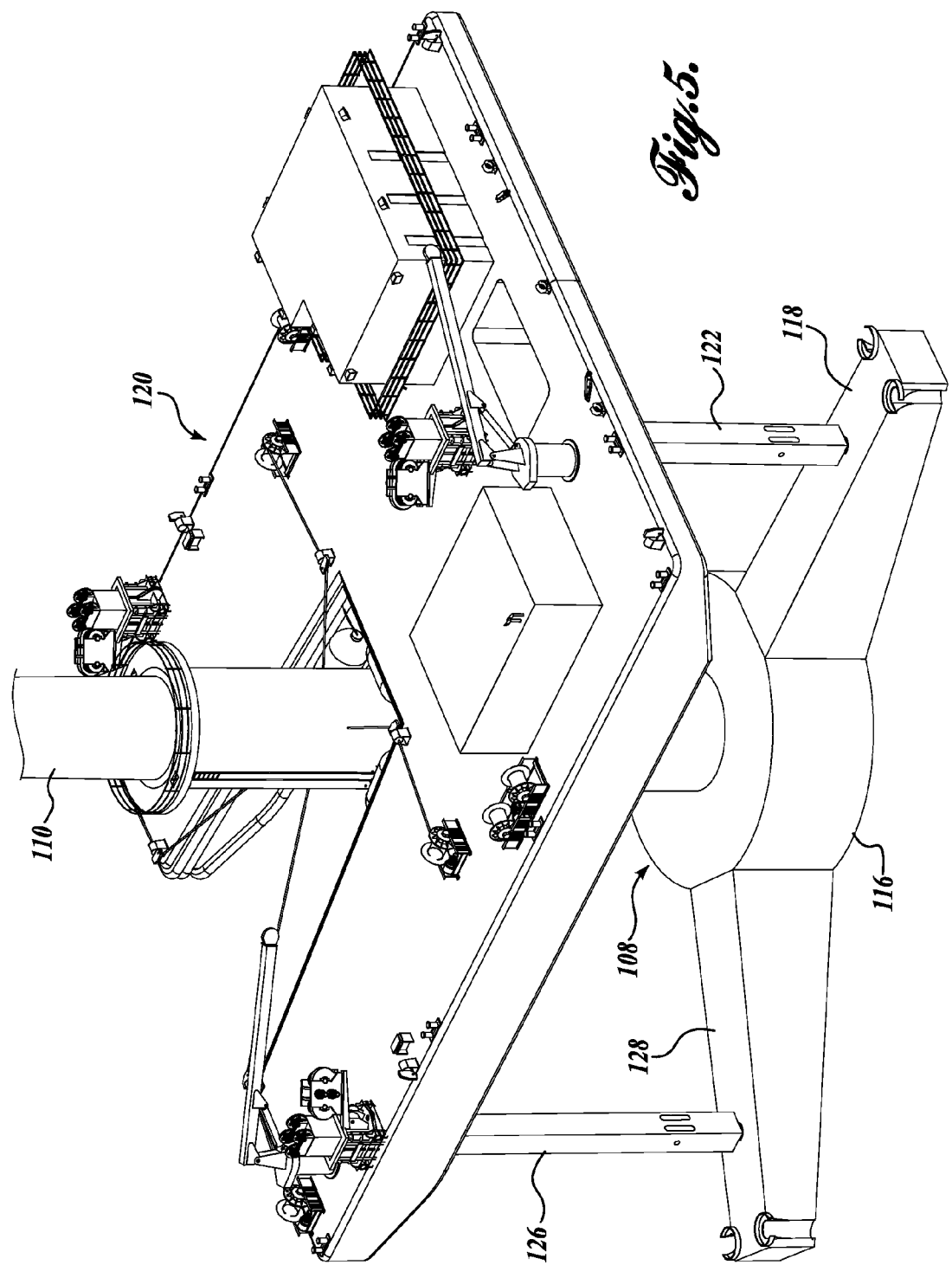
FIG. 5 is a diagrammatical illustration showing one embodiment of a step for a method of installing a water-submersible platform.

Referring to FIG. 5, once the assembly comprising the vessel 120 and the platform 108 arrives at the installation site, the method includes lowering the platform 108 from the vessel 120 positioned above the platform while the spuds 122, 124, and 126 connecting the vessel 120 to the platform 108 stabilize the platform 108 during lowering.

The vessel 120 may include a dynamic positioning system. One means for dynamically positioning the vessel 120 includes an instrument 152 for determining the coordinates relating to the position of the vessel 120, such as a global positioning system (GPS) and the heading of the vessel 120, such as a gyroscopic compass. One means for dynamically positioning the vessel 120 includes a central processor 150 that receives the coordinates and is programmable to compare the actual coordinates of the vessel 120 to the desired coordinates, and when the actual coordinates do not match the desired coordinates, the processor 150 instructs one or more thrusters 154 to move the vessel 120 to the position and/or heading represented by the desired coordinates. The instrument 152 may provide constant information to the central processor 150 so that the vessel remains accurately positioned while lowering the platform 108.

The platform 108 is lowered beneath the surface of the water to a predetermined depth. The vessel 120 can be directly above the platform 108 as the platform 108 is lowered. As described above, the vessel 120 is provided with spuds 122, 124, and 126 having a locking assembly at the bottom end of the spuds. The locking assemblies are connected to the platform 108. The spuds 122, 124, and 126 are elongated rigid members that are configured to be laterally stationary; however, the spuds can be lowered and raised. During the lowering of the platform 108, the platform 108 may be positively buoyant, neutrally buoyant, or negatively buoyant. When the platform 108 has positive buoyancy, meaning a tendency to float or rise to the surface of the water, the spuds will exert a downward force on the platform 108 to lower the platform 108, but also maintain control over the rate of descent during lowering the platform 108. Preferably, the spuds will be controlled to maintain the platform 108 substantially level during lowering. At the very least the spuds will prevent the platform from capsizing. When the platform 108 has negative buoyancy, meaning a tendency to sink in water, the spuds will exert an upward force on the platform 108 to maintain control over the rate of descent during lowering the platform 108. The platform 108 may also be neutrally buoyant, in which case the spuds may experience either an upward or downward force. In each case, the spuds are rigid and substantially unable to rotate about the two horizontal axes, which prevents the platform from capsizing during lowering. Substantially unable to rotate means that the spuds experience minimal side to side movement, while being retained within casings on the deck of the vessel 120.

During the lowering of the platform 108, water may be introduced into the platform 108 to reduce the load on the spuds 122, 126, and 124. For this purpose, the platform 108 may comprise one or more water ballast chambers to receive water. Furthermore, during the lowering of the platform 108, the spuds 122, 124, and 126 stabilize the platform 108. Furthermore, control is also maintained so that the spuds 122, 124, and 126 are not free to move up or down, unless commanded to do so by drive mechanisms.

The vessel 120 floats on the surface of the water and is directly above and overlaps the platform 108. Furthermore, in contrast to jack-up rigs and excavator barges, spuds 122, 124, and 126 are used during the lowering of a water-submersible platform beneath the surface of the water for maintaining stability of the platform, and not for maintaining position of the vessel, and also not for raising the vessel above the surface of the water. Accordingly, the spuds 122, 124, and 126 do not reach to the sea floor as in the jack-up rig or the excavator barge. Instead, the bottom end of the spuds 122, 124, 126 are configured to connect to the platform 108. In the disclosed method, the spuds 122, 124, and 126 are not used to support the vessel 120 above the surface of the water, nor are the spuds 122, 124, and 126 used to hold the vessel 120 in a stationary position. The use of the spuds 122, 124, and 126 in this embodiment allows the lowering of a water-submersible platform 108 without capsizing and, in some cases, without substantial roll and pitch movement of the platform 108 relative to the vessel 120. In other cases, the spuds can be commanded such that the platform 108 can be lowered without capsizing and substantial roll and pitch movement of the vessel relative to the platform is allowed. The spuds can be configured to have insubstantial play in the recesses or casings within which they reside, and the spuds are not free to move up or down unless commanded, which allows for maintaining the platform essentially level during lowering. Furthermore, when transporting the platform 108 to an installation site, the spuds can be retracted upward to juxtapose the platform 108 next to the underside of the vessel 108.

Figure 6:
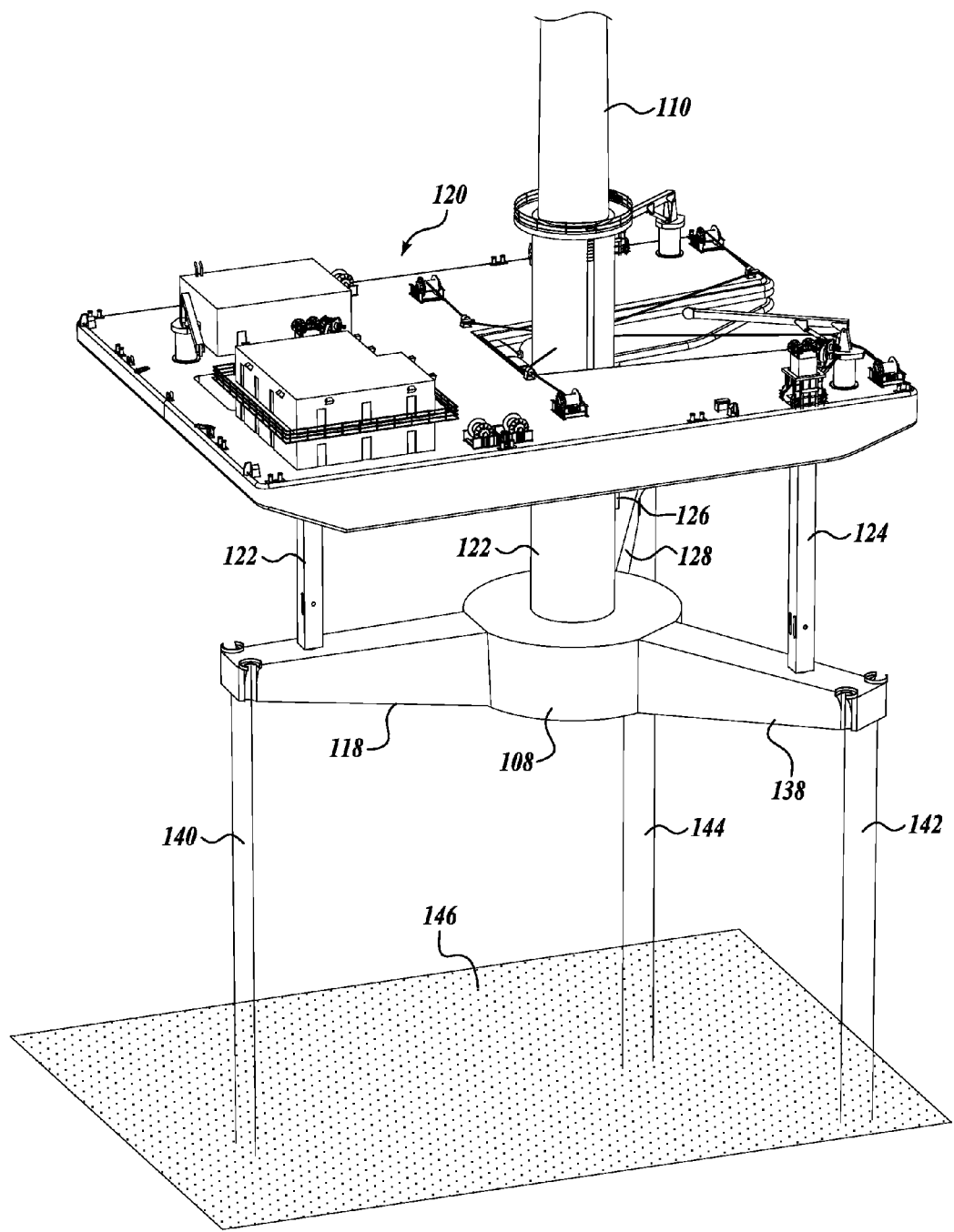
FIG. 6 is a diagrammatical illustration showing one embodiment of a step for a method of installing a water-submersible platform.

Referring to FIG. 6, once the platform 108 is at a predetermined depth, the installation method includes attaching mooring elements, such as tendons 140, 142, and 144 are attached from the platform 108, such as from tendon arms 118, 128, and 138, to the sea floor. Tendons 140, 142, and 144 may be attached to the sea floor 106 via anchors or pre-driven piles. Tendons 140, 142, and 144 may be attached to the platform 108 and the sea floor anchors or piles using common techniques, for example, the use of shackles and padeyes, pipe compression fittings, or other techniques. Tendons 140, 142, and 144 may include one or more cables, and more than one tendon may be used for each attachment between the platform 108 to the sea floor. When tendons 140, 142, and 144 are finished being attached to the platform 108, such as at the tendon arms 118, 128, and 138, the platform 108 may be de-ballasted of water to create positive buoyancy in the platform 108 and apply tension on the tendons 140, 142, and 144. While tendons are described as one means for mooring a platform to the sea floor, other means, besides tendons, for mooring a platform to the sea floor include a single point moor, such as one mooring line, such as chain, rope, or a combination, and a spread moor, such as mooring chains, ropes, or a combination. In both cases, the mooring system is primarily designed to withstand horizontal forces and has a more limited ability to withstand vertical forces. Tendons are vertically oriented mooring lines comprised of pipe, chain, ropes, or a combination. Tendons are primarily designed to with stand vertical forces.

Figure 7:
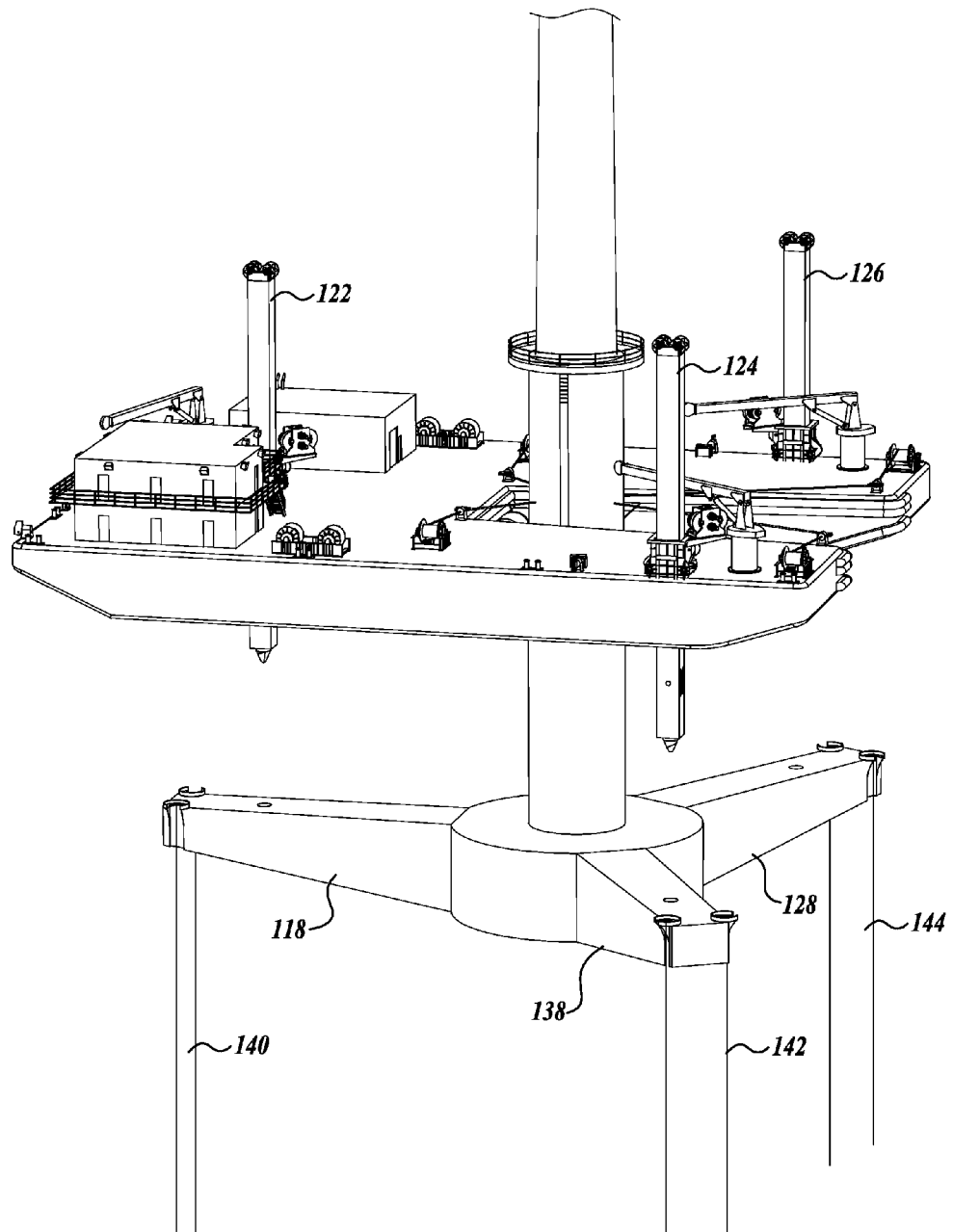
FIG. 7 is a diagrammatical illustration showing one embodiment of a step for a method of installing a water-submersible platform.

Referring to FIG. 7, once the tendons 140, 142, and 144 are attached to the platform 108, such as at the tendon arms 118, 128, and 138, the installation method includes disconnecting the spuds 122, 124, and 126 from the platform 108. The spuds 122, 124, and 126, may then be raised vertically. Following disconnecting the spuds 122, 124, and 126 from the platform 108, and raising of the spuds 122, 124, and 126, the vessel 120 may return to the quay or other facility to repeat the installation process for another platform.

Figure 8:
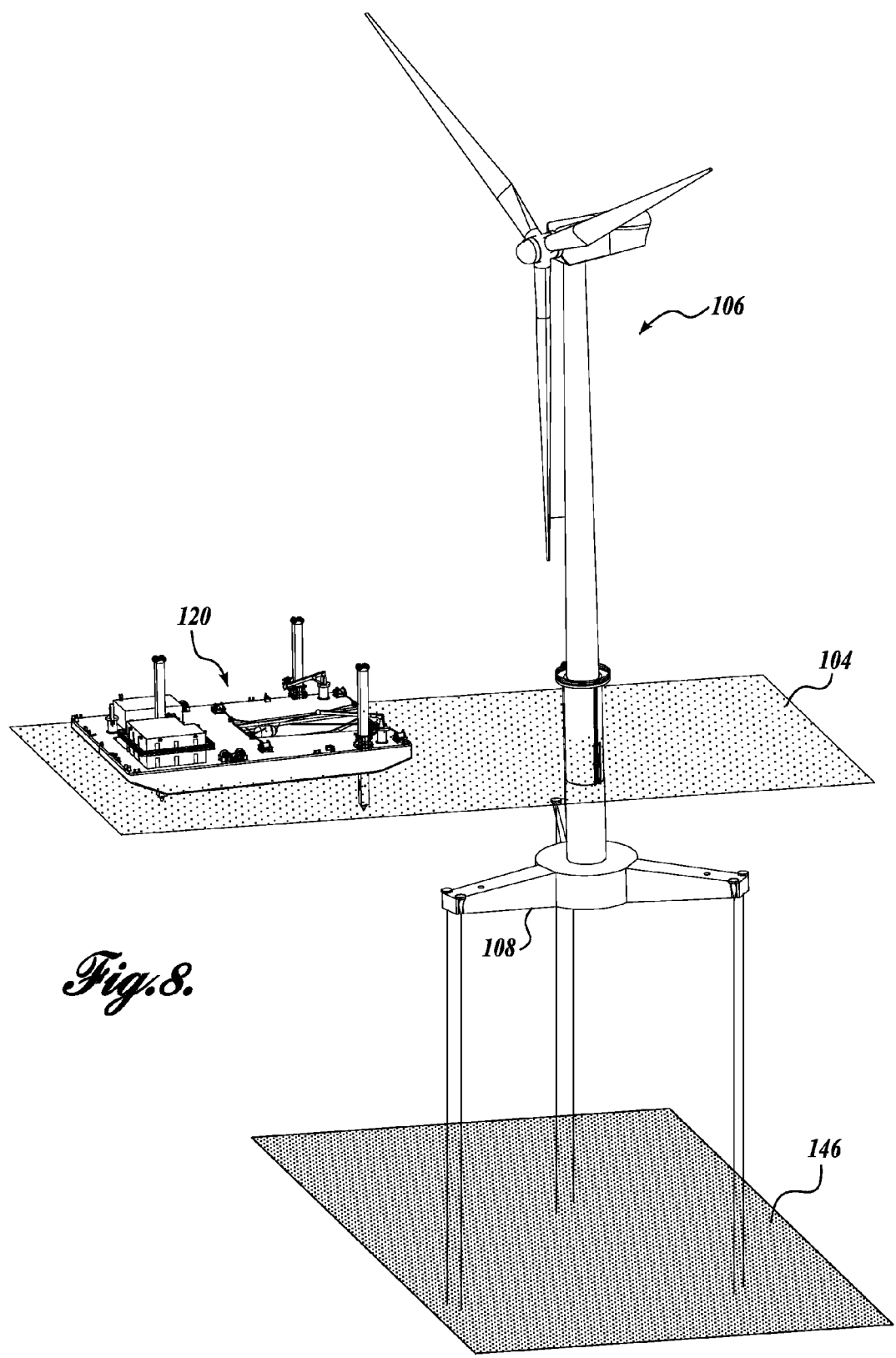
FIG. 8 is a diagrammatical illustration showing one embodiment of a step for a method of installing a water-submersible platform.

FIG. 8 shows a tension leg platform 108 attached to the sea floor 146 via tendons, installed using the method disclosed herein. The platform 108 is below the surface of the water and supports a wind turbine 106 above the surface of the water. The method disclosed herein may be used to install other water-submersible platforms. An advantage of the method is the ability to install an unstable platform by connecting the unstable platform to a stable water-buoyant vessel. In the method, the unstable platform can be transported while being fully submerged in water, except for any superstructure, to the installation site. "Unstable" is to be understood refers to the platform were the platform to be unattached to the vessel. Once at the installation site, the unstable platform is lowered directly underneath the stable water-buoyant vessel while the unstable platform remains connected to the stable vessel. During lowering, stability is imparted to the platform through the controlled lowering of rigid vertically positioned spuds that apply a force to the platform. The method allows unstable platforms to be built where most convenient, usually alongside a quay or in a dry dock, and then transported even when such platforms remain unstable. This is possible because the vessel imparts stability to an otherwise unstable platform. Therefore, substantially assembled platforms, which are unstable, can be transported and installed in accordance with the disclosed method.

Referring to FIGS. 9-12, a description of a locking assembly for connecting the platform 108 to vessel 120 will be described. Locking assemblies as illustrated in these figures may be provided at the bottom ends of the spuds.

Figure 9:
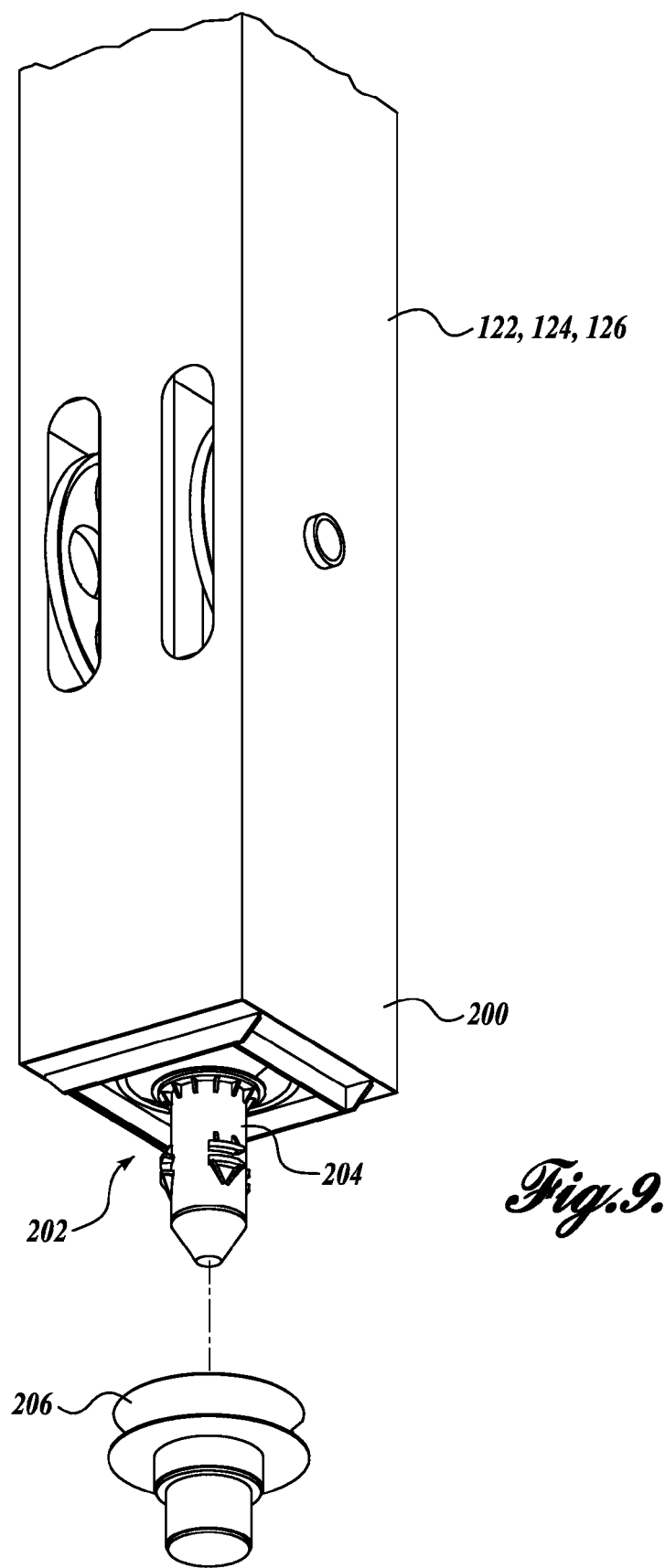
FIG. 9 is a diagrammatical illustration showing one embodiment of a spud tip.

Referring to FIG. 9, the bottom end of a spud 200 is illustrated. Spud 200 is representative of spuds 122, 124, and 126 on vessel 108. The spuds 122, 124, and 126 include an elongated rigid member, such as the spud member 200. The illustrated spud 200 of FIG. 9 is shown as having a square cross section; however, other shapes are within the scope of this invention. In one embodiment, the elongated rigid member 200 is hollow to allow the placement of a system of cables and sheaves for raising and lowering the spud. The cable system to raise and lower spuds, such as spuds 122, 124, and 126 is described below. Unlike the spuds disclosed herein, the bottom end of conventional spuds do not include the ability to lock onto platforms. Conventional spuds have a bottom end configured to directly pierce the sea floor to allow a vessel to remain stationary relative to the sea floor, or to resist penetration into the sea floor to support the weight of the vessel when raising itself above the waters surface. In the disclosed vessel 108, the bottom end of the spuds 122, 124, and 126 are not configured to extend to the sea floor, and instead include a locking assembly 202 to connect to a platform, such as platform 108. In one embodiment, the locking assembly 202 includes a tip 204 that projects downwardly from the bottom end of the spuds 122, 124, and 126. A receptor foundation 206 is provided on the top side of the platform 108, such as on the top side of the tendon arms 118, 128, and 138, wherein the receptor foundation 206 is configured to receive the tip 204.

Figure 10:
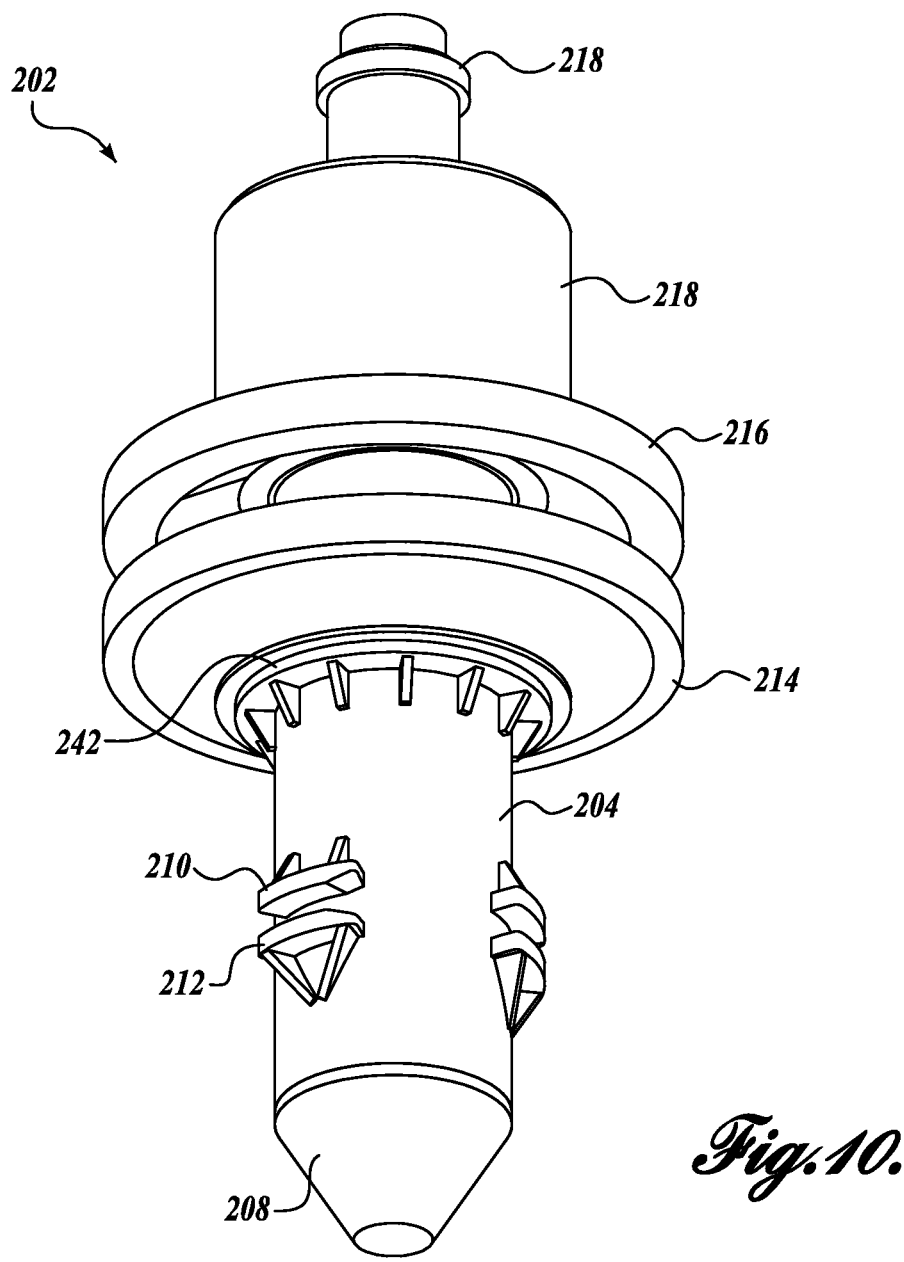
FIG. 10 is a diagrammatical illustration showing one embodiment of a spud tip.

Referring to FIG. 10, the locking assembly 202 for the bottom end of the spuds 122, 124, and 126 is illustrated in more detail. The tip 204 can be formed from a cylindrical body. The lower end of the tip 204 can be provided with an elastomeric nose cone 208. In one embodiment, a locking action is created by rotating the tip 204 in the receptor foundation 206. For this purpose, the tip body 204 includes one or a plurality of locking tabs, such as tabs 210 and 212. The locking tabs 210 and 212 resemble ledges provided lengthwise along the circumference of the tip 204. Each locking location may include an upper locking tab, such as tab 210, and a lower locking tab, such as 212. The tabs 210 and 212 are positioned parallel to one another, such as to create an upper ledge and a lower ledge having a slot therebetween along the circumference of the tip 204. One or more pairs of locking tabs, such as tabs 210 and 212, can be provided in a similar fashion around the circumference of the tip 204. While the placement of a pair of tabs create slots following the circumference of the tip 204, two pairs of tabs also create gaps between the pairs in a lengthwise direction to the tip 204. The gaps allow matching keys of the receptor foundation 206 to first engage vertically to the point where keys are in line with the slots created between parallel tabs, then the tip 204 is rotated, such that the pair of tabs 210 and 212 captures the matching key from above and below.

Still referring to FIG. 10, the locking assembly 202 includes a compression ring 214 to support compression loads and a tension ring 216 to support tension loads. For example, the compression ring and tension ring may be designed to withstand up to 1,300,000 pounds of vertical compression or tension, respectively. Both the compression ring 214 and the tension ring 216 can support horizontal shear loads. For example, the compression and tension rings may be designed to withstand up to 200,000 pounds of horizontal shear load. However, the designs will vary based on the particular application. As will be described below, the compression ring 214 and the tension ring 216 can be made by laminating an elastomeric material between a first inner ring and a second outer ring. The compression ring 214 and the tension ring 216 are placed concentrically with the tip 204. The tip 204 length may extend sufficiently so that the compression rings 214 and the tension ring 216 are fitted concentrically onto the tip 204. The outer ring of the compression ring 214 and the tension ring 216 may be fixed against translation in three axes. For this purpose, the tip 204 may include gusseted retaining rings, such as ring 242, to support the inner ring of the compression ring 214 and the tension ring 216 from above or below so as to prevent coaxial movement of the compression ring 214 and the tension ring 216 along the tip body 204. The compression ring 214 may be placed on the tip 204 at a lower elevation than the tension ring 216 such that a space exists between the compression ring 214 and the tension ring 216. The outer ring of the compression ring 214 and the tension ring 216 may be affixed to the inside of the spud member 200 to prevent vertical displacement of the compression ring 214 and the tension ring 216 relative to the spud member 200. The outer ring of the compression ring 214 and the tension ring 216 are also affixed to the spud member 200 so as to prevent rotation of the compression ring 214 and the tension ring 216 relative to the spud member 200. However, the tip 204 is allowed to rotate on its longitudinal axis within the compression ring 214 and the tension ring 216 to engage the locking action. The rotation may only be enough so that the pair of tabs, such as tabs 210 and 212, engage with a matching key. Rotation of the tip 204 may be clockwise or counterclockwise to engage the locking motion, and the opposite motion unlocks or disengages the tip 204. For this purpose, the upper end of the tip 204 can be provided with a shaft connected to a rotary actuator 220 that is used to rotate the lower tip 204 to engage the tabs with the matching keys. The rotary actuator 220 can be a hydraulically driven actuator. The rotary actuator 220 can be supported on a foundation structure 218. To allow for the rotation, the inner ring of the compression ring 214 and the inner ring of the tension ring 216 allows the tip 204 to rotate against the inner circumference of the inner rings of the compression ring 214 and the tension ring 216.

Figure 11:
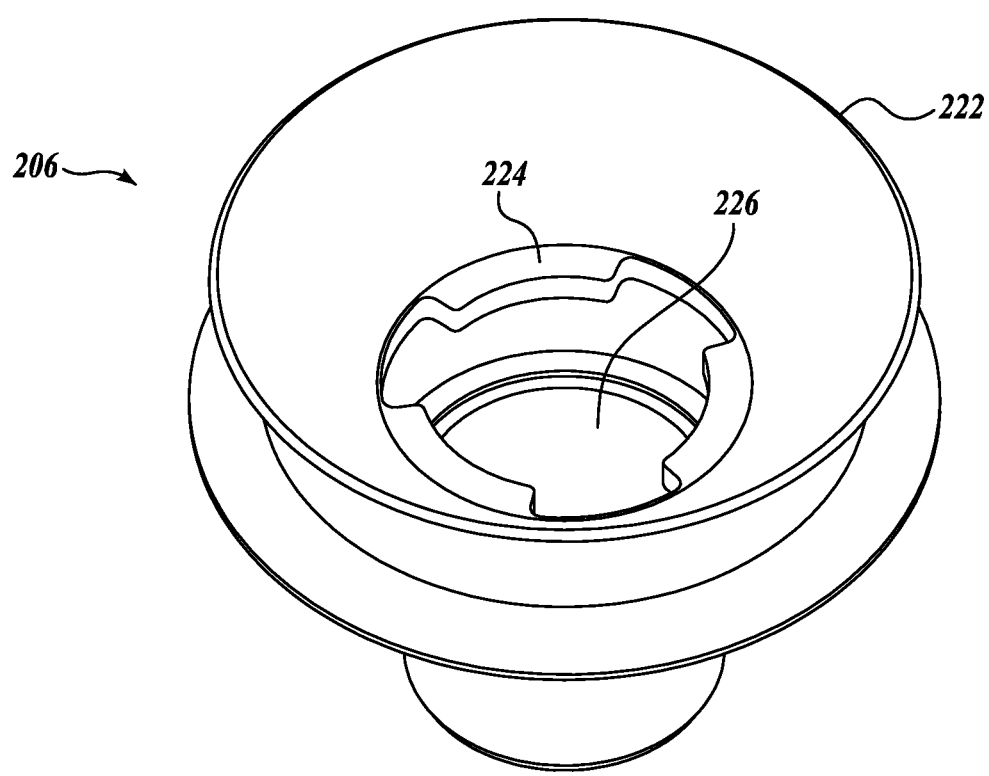
FIG. 11 is a diagrammatical illustration showing one embodiment of a receptor foundation for a spud tip.

Referring to FIG. 11, a receptor foundation 200 is illustrated in detail. The receptor foundation 200 can be provided on the top side of the platform 108 in order for the spuds to connect to the platform 108. In one embodiment, a receptor foundation 200 is provided in the tendon arms 118, 128, and 138. The receptor foundation 200 includes an alignment cone 222 that assists positioning of a corresponding spud tip from the vessel 120 into the proper locking position. The cone 222 includes a larger diameter at a top end thereof and a smaller diameter at a bottom end thereof. The cone 222 leads into an aperture 226 that receives the tip 204. Accordingly, the aperture 226 may be of a larger diameter than the diameter of the corresponding tip 204. The upper end of the aperture 226 includes one or more locking keys 224. The keys are placed around the inside circumference of the upper end of the aperture 226. The length of the keys 224 is configured to allow fitting the keys vertically in the gaps between pairs of locking tabs on the tip 204. The bottom end of the aperture 226 may be provided with a bottom plate 244

Figure 12:
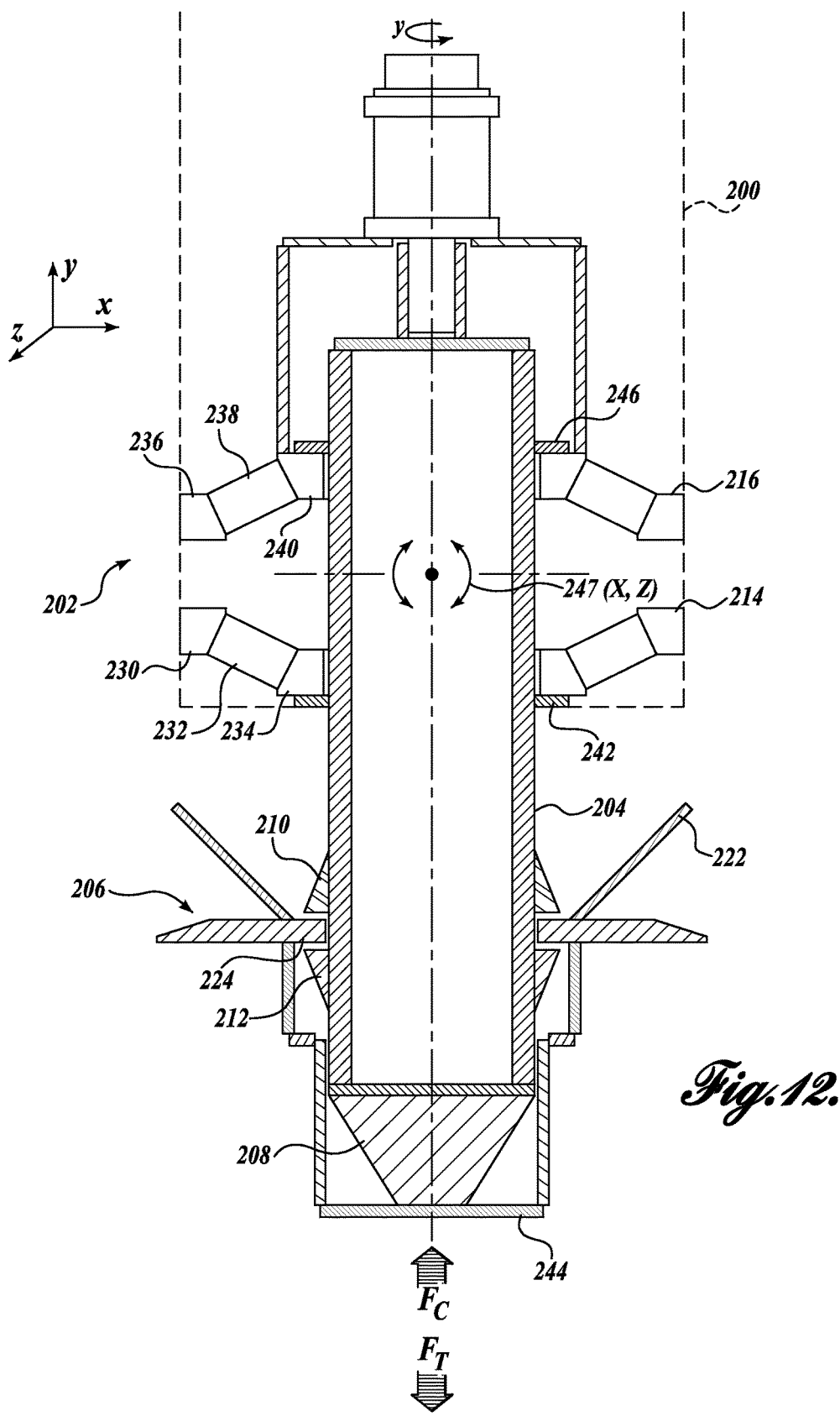
FIG. 12 is a diagrammatical illustration showing one embodiment of a spud tip.

(as best seen in FIG. 12) such that when the cone 208 at the bottom of the tip 204 rests against the plate 244, the slot between parallel locking tabs, such as tabs 210 and 212, is in alignment with a matching key 224. This allows the tip 204 to rotate such that the locking keys 224 will fit within the parallel slot created by a pair of upper and lower locking tabs, such as tabs 210 and 212. As can be appreciated, in this position, the tip 204 is prevented from disengaging from the receptor foundation 200, thereby locking the vessel 120 to the platform 108.

Referring now to FIG. 12, a cross-sectional illustration of the locking assembly 202 is provided. FIG. 12 more clearly shows the laminated structures of the compression ring 214 and the tension ring 216. The compression ring 214 includes an outer ring 230, an inner ring 234, and an elastomer 232 connecting the outer ring 230 with the inner ring 234. The outer circumference of the outer ring 230 is fixed relative to the inside wall of the spud member 200. However, the inside circumference of the inner ring 234 is not fixed to the outer surface of the tip 204, thus allowing rotation. The inside circumference of the inner ring is fixed in translation and rotation around both horizontal axes. The inner ring is free to rotate only around the vertical axis. Further, the outer ring 230 is at a higher elevation with respect to the inner ring 234, such that the elastomer 232 is canted. The inner ring 234 is supported from the bottom by the gusseted ring 242. Thus, compression forces $F_C$ would tend to compress the elastomer 232.

The tension ring 216 includes a laminated structure having an outer ring 236, an inner ring 240, and an elastomer 238 connecting the outer ring 236 with the inner ring 240. The outer circumference of the outer ring 236 is fixed relative to the inside wall of the spud member 200. However, the inner circumference of the inner ring 240 is not fixed to the outer wall of the tip 204, and thus, allows rotation. In contrast to the compression ring 214, the tension ring 216 has the outer ring 236 at a lower elevation in comparison to the inner ring 240. The inner ring 240 is supported from the top by the gusseted ring 246. This construction allows the elastomer 238 to compress when under tension, $F_T$.

The outer ring 230 and 236 of the compression and tension rings 214, 216, respectively are fixed in translation in three axes. The inner rings 234 and 240 are attached to the spud tip. The elastomeric material between the inner and outer rings allows some translation of the spud tip in all three axes, as well as rotation around both horizontal axes. The elastomeric material provides some rotation and translation of the spud tip relative to the spud.

Both elastomers 232 and 238 support horizontal sheer while permitting some rotation (flexing) around both horizontal axes. For example, rotation of up to 10 degrees about the horizontal axes may be possible. The rotation around a horizontal axis is depicted in FIG. 12 by reference to arrows 247. Arrows 247 depict rotation about a horizontal axis, such as axis X or Z. The X axis and the Z axis are in the horizontal plane, such that one axis is a horizontal line passing the center point from right to left, while the second axis is the axis projecting from front to back through the center point.

Referring to FIGS. 13 and 14 collectively, one embodiment of a drive mechanism is illustrated comprising a winch system 300 for raising and lowering spuds. In one embodiment, a winch system is provided for raising and lowering spuds that can be controlled to provide constant force on the spuds. Other systems, including a rack and pinion system may also be used for raising and lowering spuds that can be controlled to provide constant force on spuds. The illustrated drive mechanism that raises and lowers the spuds includes a system of cables and sheaves, wherein the cables are connected to one or more winches that take up or release cable in a controlled manner. A representative winch system will be described for one spud. It is to be appreciated that the same winch system may be constructed for each spud on the vessel 120.

A casing 302 extends from above the vessel 120 deck surface to the lower hull surface. The casing 302 is a structure that holds a spud 304 upright and substantially vertically aligned as the spud 304 is raised or lowered. The spud 304 includes an elongated rigid hollow member. In one embodiment, the spud 304 can have a square cross section. The spud 304 includes a first 306, second 308, third 310, and fourth 312 sheave placed at each corner at the top of the spud 304, such that the first sheave is parallel with the second, and the third sheave is parallel to the fourth, forming two sets of two sheaves that can support two cable sections to route the cable from side to side and over the top of the spud 304. The spud 304 includes a fifth 314 and sixth 316 sheave placed at near the bottom end and within the interior of the spud. The number of sheaves is to provide a mechanical advantage. The fifth 314 and sixth 316 sheaves are of a diameter sufficient to span the side width of the spud 304, such that only one sheave is necessary for a cable to pass from side to side at the bottom of the spud 304. The top surface of the casing 302 supports an outer 322 and inner 324 turning sheave. The turning sheaves are located exterior to the spud 304. The outer and inner sheaves 322 and 324 are placed perpendicular to the top and bottom sheaves. On the side of the casing 302 that is opposite to the turning sheaves, a traction winch 326 is placed on an upper surface of the casing 302. The traction winch 326 is a mechanical device that uses the friction of several wraps of a cable around the winch drums to pull on the cable in either direction. The traction winch 326 may include twin drums with grooves that receive a cable, and a driver to rotate the winch drums. Below the traction winch 326, the casing 302 also supports a first 328 and second 330 fairlead sheave. All sheaves are basically used to change the direction of a cable.

In one embodiment, the winch system may include a single continuous cable 332. However, it is to be appreciated that other winch systems may be used employing the use of a multiplicity of cables and/or winches. The cable 332 has a first bitter end that is anchored to the upper side of the casing 302. The cable 332 is next routed upwards and supported by the first 306 and second 308 parallel sheaves, such that the cable 332 passes over the top of the spud 304. The cable 332 is next routed downward and around the outer turning sheave 322, and re-directed up the spud 304, where the cable 332 is next supported on the third 310 and fourth 312 parallel sheaves to pass over the top of the spud 304 a second time. The cable 332 is routed downward and to a winch drum of the winch 326. The cable 332 is wrapped around the winch drum many times to provide friction. The cable 332 then exits the winch drum to continue around the lower part of the spud.

After exiting the winch drum, the cable 332 passes over the fairlead sheave 330 and is next guided downwards within the interior of the spud 304 to pass around the sixth sheave 316 to cross from one side to the other side of the spud. The cable 332 is next routed upwards and around the inner turning sheave 334, and re-directed down the interior of the spud 304. The cable 332 is next passed under the fifth sheave 314 to cross from side to side of the spud 304 a second time. The cable 332 is guided upward and in the interior of the spud 304 through the fairlead sheave 334, where it exits the spud 304. After exiting from the spud, the cable 332 terminates in a second bitter end, which is anchored. Specifically, the second bitter end of cable 332 is anchored to a cable tensioning cylinder 336. The cable tensioning cylinder may take out any slack in the cable.

As can be appreciated, rotation of the winch drum will allow the simultaneous taking in of the cable on one side of the winch with the release of the cable on the other side of the winch that allows, in a controlled manner, the raising or lowering of the spud 304. Constant tension can be maintained on the cable such that the spud 304 can neither rise or fall unexpectedly during raising and lowering.

A feature of the winch system 300 is the ability to apply and maintain a constant force on the spud as the spud is being lowered or raised. In one embodiment, the winch system 300 is provided with an instrument 342 that provides an indication of the amount of force that the spud is being subjected to. The force can be sensed at the winch drum or alternatively on the spud, such as via the use of a strain gauge, load cell, or the like. The winch system 300 is provided with a processor 340, which is programmable to maintain a constant force on the spud. The processor 340 may, for example, receive the force sensed by the instrument 342, compare the actual force to a force limit or whether the actual force is within an acceptable force range. If the actual force is above a limit or not within an acceptable range, the processor 340 may instruct the winch to may make adjustments, for example, the winch may increase its speed, decrease its speed, reverse direction or stop altogether. Further, each spud winch system may communicate with all other winch systems to maintain an equal and constant force on the spuds.

It should be mentioned that as the spuds are raised or lowered, the spuds remain substantially vertically aligned within their casings, such that the longitudinal axis of a spud remains perpendicular to the planar deck of the vessel 120. For example, the spuds do not significantly rotate around a horizontal axis. To keep the spuds in a substantially upright manner, the spuds can travel on rails that maintain the straight alignment.

In view of the above description, embodiments of the invention include a method for installing a water-submersible platform, an assembly of a water-submersible platform and water-buoyant vessel, and a buoyant vessel.

The method for installing a water-submersible platform may include lowering the platform in water from a vessel positioned above the platform while spuds connecting the vessel to the platform stabilize the platform during lowering.

In another embodiment, together with any combination of one or more steps and/or features recited above and/or below pertaining to the method for installing a water-submersible platform, the method may further include, before lowering the platform in the water, placing the vessel over the platform, and connecting a lower end of the spuds to the platform.

In another embodiment, together with any combination of one or more steps and/or features recited above and/or below pertaining to the method for installing a water-submersible platform, the method may further include, to place the vessel over the platform, lowering the platform below a water surface to a depth that allows placing the vessel over the platform.

In another embodiment, together with any combination of one or more steps and/or features recited above and/or below pertaining to the method for installing a water-submersible platform, the method may further include, ballasting the platform with water to assist in lowering the platform before placing the vessel over the platform.

In another embodiment, together with any combination of one or more steps and/or features recited above and/or below pertaining to the method for installing a water-submersible platform, the method may further include, after connecting the spuds to the platform, raising the spuds and raising the platform to a position underneath the vessel.

In another embodiment, together with any combination of one or more steps and/or features recited above and/or below pertaining to the method for installing a water-submersible platform, the method may further include, de-ballasting the platform of water to assist in raising the platform to the vessel.

In another embodiment, together with any combination of one or more steps and/or features recited above and/or below pertaining to the method for installing a water-submersible platform, the method may further include, after the platform is lowered to a predetermined depth in the water, attaching mooring elements from a seafloor to the platform.

In another embodiment, together with any combination of one or more steps and/or features recited above and/or below pertaining to the method for installing a water-submersible platform, the method may further include, after the platform is attached to the seafloor via tendons, disconnecting the spuds from the platform, and then raising the spuds.

In another embodiment, together with any combination of one or more steps and/or features recited above and/or below pertaining to the method for installing a water-submersible platform, the method may further include wherein the vessel floats on the surface of the water while lowering the platform.

In another embodiment, together with any combination of one or more steps and/or features recited above and/or below pertaining to the method for installing a water-submersible platform, the method may further include wherein the vessel is directly above the platform while lowering the platform.

In another embodiment, together with any combination of one or more steps and/or features recited above and/or below pertaining to the method for installing a water-submersible platform, the method may further include, wherein the spuds apply a downward force on the platform to lower the platform in the water.

In another embodiment, together with any combination of one or more steps and/or features recited above and/or below pertaining to the method for installing a water-submersible platform, the method may further include, wherein the spuds apply an upward force on the platform while lowering the platform in the water.

In another embodiment, together with any combination of one or more steps and/or features recited above and/or below pertaining to the method for installing a water-submersible platform, the method may further include, wherein the platform has neutral buoyancy during lowering.

In another embodiment, together with any combination of one or more steps and/or features recited above and/or below pertaining to the method for installing a water-submersible platform, the method may further include, wherein the platform has negative buoyancy during lowering.

In another embodiment, together with any combination of one or more steps and/or features recited above and/or below pertaining to the method for installing a water-submersible platform, the method may further include, wherein the platform has positive buoyancy during lowering.

In another embodiment, together with any combination of one or more steps and/or features recited above and/or below pertaining to the method for installing a water-submersible platform, the method may further include, ballasting the platform with water before or during lowering.

In another embodiment, together with any combination of one or more steps and/or features recited above and/or below pertaining to the method for installing a water-submersible platform, the method may further include, before lowering the platform in the water, moving the vessel with the platform juxtaposed underneath the vessel to an installation site.

In another embodiment, together with any combination of one or more steps and/or features recited above and/or below pertaining to the method for installing a water-submersible platform, the method may further include, wherein the platform comprises superstructure supported on a central hull, wherein the superstructure extends above the water surface.

In another embodiment, together with any combination of one or more steps and/or features recited above and/or below pertaining to the method for installing a water-submersible platform, the method may further include, wherein the spuds connected to the platform are held in a fixed lateral position on the vessel, and the spuds connected to the platform are configured to lower and raise while in the fixed lateral position.

In another embodiment, together with any combination of one or more steps and/or features recited above and/or below pertaining to the method for installing a water-submersible platform, the method may further include, wherein the spuds connected to the platform are elongated rigid members positioned vertically on the vessel.

In another embodiment, together with any combination of one or more steps and/or features recited above and/or below pertaining to the method for installing a water-submersible platform, the method may further include, wherein the platform would capsize in water when unattached to the vessel.

In another embodiment, together with any combination of one or more steps and/or features recited above and/or below pertaining to the method for installing a water-submersible platform, the method may further include, wherein when the spuds reach a limit of downward extension, the spuds do not reach a seafloor.

In another embodiment, together with any combination of one or more steps and/or features recited above and/or below pertaining to the method for installing a water-submersible platform, the method may further include, wherein the platform is a tension leg platform comprising a central hull and tendon arms extending radially from the central hull.

In another embodiment, together with any combination of one or more steps and/or features recited above and/or below pertaining to the method for installing a water-submersible platform, the method may further include, wherein the spuds connected to the platform are laterally spaced from one another on the vessel.

An embodiment of an assembly of a water-submersible platform and water-buoyant vessel may include a water-buoyant vessel on a surface of water; and a water-submersible platform having substantial superstructure extending above the water surface, wherein the platform is juxtaposed below the vessel and connected to the vessel to receive a stabilizing force from the vessel.

In another embodiment, together with any combination of one or more features recited above and/or below pertaining to the assembly of the water-submersible platform and the water-buoyant vessel, the assembly may further include, wherein the platform has positive, neutral or negative buoyancy when unattached to the vessel.

In another embodiment, together with any combination of one or more features recited above and/or below pertaining to the assembly of the water-submersible platform and the water-buoyant vessel, the assembly may further include, wherein the platform is configured to be anchored to a sea floor.

In another embodiment, together with any combination of one or more features recited above and/or below pertaining to the assembly of the water-submersible platform and the water-buoyant vessel, the assembly may further include, wherein the vessel comprises spuds, the spuds connect the vessel to the platform, the spuds are held in a fixed lateral position on the vessel, and the spuds connected to the platform are configured to lower and raise while in the fixed lateral position.

In another embodiment, together with any combination of one or more features recited above and/or below pertaining to the assembly of the water-submersible platform and the water-buoyant vessel, the assembly may further include, wherein the vessel comprises spuds, the platform comprises a central hull and tendon arms extending radially from the central hull, the spuds are connected to the tendon arms, the spuds are held in a fixed lateral position on the vessel, and the spuds connected to the tendon arms are configured to lower and raise while in the fixed lateral position.

In another embodiment, together with any combination of one or more features recited above and/or below pertaining to the assembly of the water-submersible platform and the water-buoyant vessel, the assembly may further include, wherein the vessel comprises spuds, the spuds connect the vessel to the platform, the spuds are held in a fixed lateral position on the vessel, and the spuds connected to the platform are configured to restrain the platform when transiting at sea.

In another embodiment, together with any combination of one or more features recited above and/or below pertaining to the assembly of the water-submersible platform and the water-buoyant vessel, the assembly may further include, wherein the vessel comprises spuds, the spuds connect the vessel to the platform, and the spuds are elongated rigid members positioned substantially vertically on the vessel.

In another embodiment, together with any combination of one or more features recited above and/or below pertaining to the assembly of the water-submersible platform and the water-buoyant vessel, the assembly may further include, wherein the vessel comprises spuds, the spuds connect the vessel to the platform, and the spuds are laterally spaced from one another on the vessel.

In another embodiment, together with any combination of one or more features recited above and/or below pertaining to the assembly of the water-submersible platform and the water-buoyant vessel, the assembly may further include, wherein the platform comprises a central hull and tendon arms extending radially from the central hull, and the tendon arms are tapered to reduce the thickness of the tendon arms from the central hull toward the end of the tendon arms.

In another embodiment, together with any combination of one or more features recited above and/or below pertaining to the assembly of the water-submersible platform and the water-buoyant vessel, the assembly may further include, wherein the platform comprises a raised structure on the platform, the raised structure extends above the vessel, and the vessel comprises a notch to allow space for the raised structure.

In another embodiment, together with any combination of one or more features recited above and/or below pertaining to the assembly of the water-submersible platform and the water-buoyant vessel, the assembly may further include, wherein the vessel comprises spuds, the spuds comprise a bottom end connected to the upper side the platform to hold the platform stable.

In another embodiment, together with any combination of one or more features recited above and/or below pertaining to the assembly of the water-submersible platform and the water-buoyant vessel, the assembly may further include, wherein the vessel comprises spuds, the spuds traverse the structural depth of the vessel to connect to the platform, and the spuds extend above the vessel.

In another embodiment, together with any combination of one or more features recited above and/or below pertaining to the assembly of the water-submersible platform and the water-buoyant vessel, the assembly may further include, wherein the platform comprises water ballast chambers.

In another embodiment, together with any combination of one or more features recited above and/or below pertaining to the assembly of the water-submersible platform and the water-buoyant vessel, the assembly may further include, wherein the vessel comprises spuds, the bottom end of the spuds have a locking assembly comprising a tip extending downwardly, wherein the tip is configured to rotate in a horizontal plane.

In another embodiment, together with any combination of one or more features recited above and/or below pertaining to the assembly of the water-submersible platform and the water-buoyant vessel, the assembly may further include, wherein the locking assembly comprises a tension support ring and a compression support ring concentric to the tip.

In another embodiment, together with any combination of one or more features recited above and/or below pertaining to the assembly of the water-submersible platform and the water-buoyant vessel, the assembly may further include, wherein the locking assembly comprises a tip having a cylindrical body, and one or more tabs on a circumference of the tip body.

In another embodiment, together with any combination of one or more features recited above and/or below pertaining to the assembly of the water-submersible platform and the water-buoyant vessel, the assembly may further include, wherein the tip is configured to lock into an alignment cone located on a top surface of a platform, the tip includes one or more locking tabs that are locked with keys surrounding an inner circumference of the cone.

An embodiment of a buoyant vessel may include a deck; a hull supporting the deck; and rigid elongated spuds positioned vertically on the vessel, wherein the spuds are fixed in a lateral position and configured to descend below the hull, and wherein a lower end of the spuds is configured to lock onto a platform.

In another embodiment, together with any combination of one or more features recited above and/or below pertaining to the buoyant vessel, the buoyant vessel may further include, a notch in the deck and hull extending inward from a side of the vessel that forms a first and second deck section on a first and second side of the notch, and at least one spud is located in the first deck section, in the second deck section, and in a deck section connecting the first deck section to the second deck section.

In another embodiment, together with any combination of one or more features recited above and/or below pertaining to the buoyant vessel, the buoyant vessel may further include, wherein the spuds comprise a locking assembly comprising a tip extending downwardly from a bottom end of the spuds, wherein the tip is configured to rotate in a horizontal plane to lock the spuds to a platform.

In another embodiment, together with any combination of one or more features recited above and/or below pertaining to the buoyant vessel, the buoyant vessel may further include, wherein the tip has a cylindrical body with one or more tabs on a circumference of the tip body.

In another embodiment, together with any combination of one or more features recited above and/or below pertaining to the buoyant vessel, the buoyant vessel may further include, wherein the spuds comprise a locking assembly comprising a tip extending downwardly from a bottom end of the spuds, and the locking assembly includes a tension support ring and a compression support ring, both placed concentric to the tip.

In another embodiment, together with any combination of one or more features recited above and/or below pertaining to the buoyant vessel, the buoyant vessel may further include, wherein the compression ring comprises an elastomer laminated between an outer and inner ring.

In another embodiment, together with any combination of one or more features recited above and/or below pertaining to the buoyant vessel, the buoyant vessel may further include, wherein the tension support ring comprises an elastomer laminated between an outer and inner ring.

In another embodiment, together with any combination of one or more features recited above and/or below pertaining to the buoyant vessel, the buoyant vessel may further include, wherein the compression support ring and the tension support ring are spaced apart from each other along the vertical direction of the tip, and are flexible to allow for the tip to rotate about a horizontal axis.

In another embodiment, together with any combination of one or more features recited above and/or below pertaining to the buoyant vessel, the buoyant vessel may further include means for propulsion on a surface of the water.

In another embodiment, together with any combination of one or more features recited above and/or below pertaining to the buoyant vessel, the buoyant vessel may further include a winch system for raising and lowering spuds that can be controlled to provide constant force on spuds.

In another embodiment, together with any combination of one or more features recited above and/or below pertaining to the buoyant vessel, the buoyant vessel may further include means for mooring to the sea floor.

In another embodiment, together with any combination of one or more features recited above and/or below pertaining to the buoyant vessel, the buoyant vessel may further include means for dynamically positioning the vessel.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for installing a water-submersible platform at a pre-determined depth, comprising:
   connecting a water-submersible platform underneath in relation to a vessel, wherein the vessel comprises a plurality of rigid elongated, vertically aligned spuds to connect the platform to the vessel, and the platform when installed is unconnected to the vessel;
   transporting the platform through water underneath the vessel to an installation site;
   while the platform is unconnected to a sea floor and underneath the vessel, exerting a downward force with the rigid elongated spuds by vertically driving the spuds to overcome a positive buoyancy of the platform throughout vertical lowering of the platform in the water from the vessel positioned above the platform while the rigid elongated spuds connecting the vessel to the platform stabilize the platform during lowering of the platform to a pre-determined depth without the spuds and platform reaching the sea floor, when the platform is at the pre-determined depth, connecting the platform to the sea floor via mooring elements; and disconnecting the platform from the spuds after the platform has been secured to the sea floor via the mooring elements, wherein the platform is moored at the pre-determined depth.

2. The method of claim 1, further comprising, before lowering the platform in the water, placing the vessel over the platform, and connecting a lower end of the spuds to the platform.

3. The method of claim 2, further comprising, to place the vessel over the platform, lowering the platform below a water surface to a depth that allows placing the vessel over the platform.

4. The method of claim 3, further comprising ballasting the platform with water to assist in lowering the platform before placing the vessel over the platform.

5. The method of claim 4, further comprising, after connecting the spuds to the platform, deballasting the platform of water and raising the spuds and raising the platform to a position underneath the vessel.

6. The method of claim 1, further comprising, after disconnecting the spuds from the platform, raising the spuds.

7. The method of claim 1, wherein the vessel floats on a surface of the water while lowering the platform.

8. The method of claim 1, wherein the vessel is directly above the platform while lowering the platform.

9. The method of claim 1, wherein the platform comprises a superstructure supported on a central hull, wherein the superstructure extends above a water surface.

10. The method of claim 1, wherein the spuds connected to the platform are held in a fixed lateral position on the vessel, and the spuds connected to the platform are configured to lower and raise while in the fixed lateral position.

11. The method of claim 1, wherein the platform would capsize in water when unattached to the vessel.

12. The method of claim 1, wherein when the spuds reach a limit of downward extension, the spuds do not reach a seafloor.

13. The method of claim 1, wherein the platform is a tension leg platform comprising a central hull and tendon arms extending radially from the central hull.

14. The method of claim 1, wherein the spuds connected to the platform are laterally spaced from one another on the vessel.

* * * * *